(12) United States Patent
Ryder et al.

(10) Patent No.: US 12,166,233 B2
(45) Date of Patent: Dec. 10, 2024

(54) SYSTEM AND METHOD FOR FIRE DETECTION AND MITIGATION FOR ENERGY STORAGE SYSTEMS

(71) Applicant: Fire & Risk Alliance, LLC, Rockville, MD (US)

(72) Inventors: Noah Lael Ryder, Rockville, MD (US); Brent Allen Turner, III, Rockville, MD (US); Ryan Alexander Hutchens, Rockville, MD (US); Anthony James Natale, Rockville, MD (US)

(73) Assignee: Fire & Risk Alliance, LLC, Rockville, MD (US)

( * ) Notice: Subject to any disclaimer, the term of this patent is extended or adjusted under 35 U.S.C. 154(b) by 0 days.

(21) Appl. No.: 18/435,761

(22) Filed: Feb. 7, 2024

(65) Prior Publication Data

US 2024/0178515 A1 May 30, 2024

Related U.S. Application Data

(63) Continuation-in-part of application No. 17/843,212, filed on Jun. 17, 2022.

(Continued)

(51) Int. Cl.
*H01M 50/383* (2021.01)
*H01M 10/48* (2006.01)
(Continued)

(52) U.S. Cl.
CPC ....... *H01M 50/383* (2021.01); *H01M 10/482* (2013.01); *H01M 10/486* (2013.01);
(Continued)

(58) Field of Classification Search
CPC ............ H01M 50/204; H01M 50/207; H01M 50/209; H01M 50/211; H01M 50/213;
(Continued)

(56) References Cited

U.S. PATENT DOCUMENTS

| | | |
|---|---|---|
| 4,220,857 A | 9/1980 | Bright |
| 4,321,466 A | 3/1982 | Mallory et al. |

(Continued)

FOREIGN PATENT DOCUMENTS

| | | | | |
|---|---|---|---|---|
| KR | 10-2154314 B1 | * | 9/2010 | ............... A62C 3/16 |
| WO | WO 2023/140659 | * | 7/2023 | ............ H01M 10/42 |

OTHER PUBLICATIONS

Notice of Allowance and Fees Due for U.S. Appl. No. 17/481,185 dated Nov. 25, 2022.

(Continued)

*Primary Examiner* — Amanda J Barrow
(74) *Attorney, Agent, or Firm* — Run8 Patent Group, LLC; Peter Miller; Brian T. Chew

(57) ABSTRACT

A system includes a battery rack including a frame configured to support a battery tray, the frame including: an inlet fluidly coupled a fluid supply; and a set of columns fluidly coupled to the inlet, each column including perforations arranged on the column and facing an interior of the battery rack, and each column defining a channel configured to circulate fluid from the inlet to the perforations. The system also includes: a valve interposed between the fluid supply and the inlet; a sensor configured to generate a signal representing ambient condition proximal the battery rack; and a controller configured to trigger the valve to transition from a closed state to an open state in response to detecting a precursor condition to a fire event based on the signal.

19 Claims, 14 Drawing Sheets

Related U.S. Application Data

(60) Provisional application No. 63/444,344, filed on Feb. 9, 2023, provisional application No. 63/299,792, filed on Jan. 14, 2022, provisional application No. 63/212,240, filed on Jun. 18, 2021.

(51) Int. Cl.
  *H01M 10/6556* (2014.01)
  *H01M 50/375* (2021.01)
  *H01M 10/613* (2014.01)

(52) U.S. Cl.
  CPC ..... *H01M 10/6556* (2015.04); *H01M 50/375* (2021.01); *H01M 10/613* (2015.04); *H01M 2200/20* (2013.01)

(58) Field of Classification Search
  CPC ............. H01M 50/216; H01M 50/244; H01M 50/247; H01M 50/249; H01M 50/251; H01M 50/253; H01M 50/383
  See application file for complete search history.

(56) References Cited

U.S. PATENT DOCUMENTS

| | | |
|---|---|---|
| 4,757,306 A | 7/1988 | Kimura |
| 4,901,056 A | 2/1990 | Bellavia et al. |
| 5,153,563 A | 10/1992 | Goto et al. |
| 5,486,811 A | 1/1996 | Wehrle et al. |
| 5,523,743 A | 6/1996 | Rattman et al. |
| 5,568,130 A | 10/1996 | Dahl |
| 5,659,292 A | 8/1997 | Tice |
| 5,691,703 A | 11/1997 | Roby et al. |
| 6,967,582 B2 | 11/2005 | Tice et al. |
| 7,746,239 B2 | 6/2010 | Nagashima |
| 7,760,102 B2 | 7/2010 | Chabanis et al. |
| 8,766,807 B2 | 7/2014 | Gonzales |
| 2003/0020617 A1 | 1/2003 | Tice et al. |
| 2006/0061478 A1 | 3/2006 | Kim |
| 2006/0261967 A1 | 11/2006 | Marman et al. |
| 2009/0072981 A1 | 3/2009 | Powell |
| 2011/0057805 A1 | 3/2011 | Loepfe et al. |
| 2013/0069543 A1 | 3/2013 | Mohan et al. |
| 2022/0355139 A1* | 11/2022 | Lee .......................... A62C 3/16 |

OTHER PUBLICATIONS

Notice of Allowance received in U.S. Appl. No. 16/456,310 dated Apr. 13, 2020.
Notice of Allowance received in U.S. Appl. No. 15/374,781 dated Feb. 26, 18.
Notice of Allowance received in U.S. Appl. No. 15/985,666 dated Mar. 29, 2019.
Notice of Allowance received in U.S. Appl. No. 16/925,858 dated Jun. 18, 2021.
Notice of Allowance received in U.S. Appl. No. 18/114,922 dated Jan. 16, 2024.
Office Action received in U.S. Appl. No. 16/456,310 dated Sep. 25, 2019.
Office Action received in U.S. Appl. No. 18/114,922 dated Aug. 3, 2023.

* cited by examiner

SYSTEM AND METHOD FOR FIRE DETECTION AND MITIGATION FOR ENERGY STORAGE SYSTEMS

CROSS-REFERENCE TO RELATED APPLICATIONS

This Application is a continuation-in-part of U.S. patent application Ser. No. 17/843,212, filed on 17 Jun. 2022, which claims the benefit of U.S. Provisional Patent Application No. 63/212,240, filed on 18 Jun. 2021, and U.S. Provisional Patent Application No. 63/299,792, filed on 14 Jan. 2022, each of which is incorporated in its entirety by this reference.

This application claims the benefit of U.S. Provisional Patent Application No. 63/444,344, filed on 9 Feb. 2023, which is incorporated in its entirety by this reference.

This Application is related to U.S. patent application Ser. No. 15/374,781, filed on 9 Dec. 2016, which is incorporated in its entirety by this reference.

TECHNICAL FIELD

This invention relates generally to the field of energy storage systems and more specifically to a new and useful method for fire detection and mitigation for energy storage systems within the field of energy storage systems.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. SYSTEM

Figure 9A:
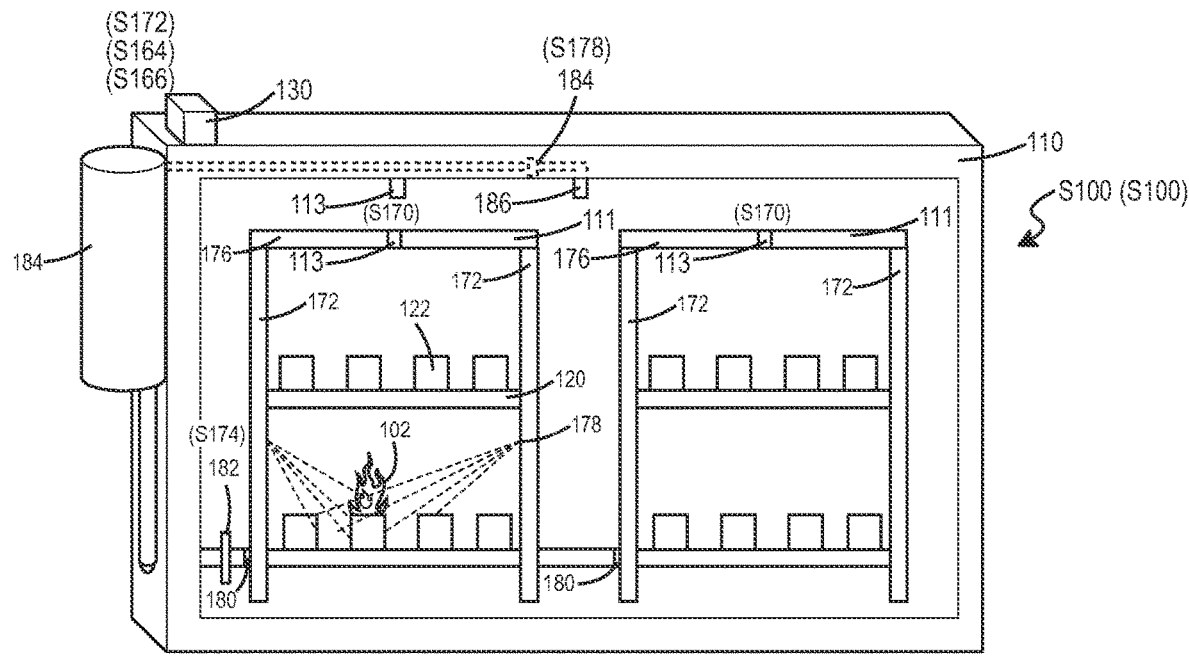
FIGS. 9A and 9B are schematic representations of one variation of the system.
Figure 9B:
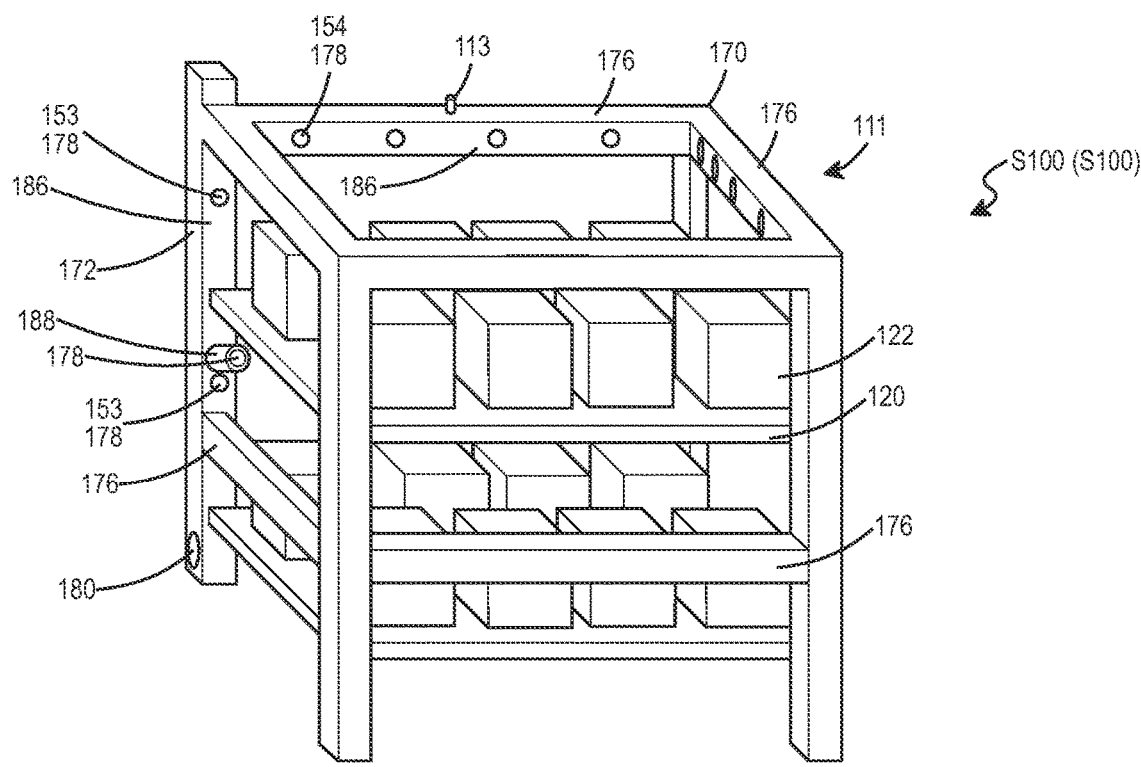

As shown in FIGS. 9A and 9B, a system 100 includes a first battery rack 111 including: a first battery tray 120 configured to receive a first set of battery cells 122; and a first frame 170 configured to support the first battery tray 120. The first frame 170 includes: a first inlet 180 fluidly coupled to a fluid supply 184; a first column 172; and a second column 172. The first column 172 includes: a first set of perforations 178 arranged on the first column 172 and facing an interior of the first battery rack 111; and a first hollow body 186 fluidly coupled to the first inlet 180 and defining a first channel configured to circulate fluid from the first inlet 180 to the first set of perforations 178. The second column 172 includes: a second set of perforations 178 arranged on the second column 172 and facing the interior of the first battery rack 111; and a second hollow body 186 fluidly coupled to the first column 172 and defining a second channel configured to circulate fluid from the first column 172 to the second set of perforations 178.

The system 100 also includes: a first valve 182 interposed between the fluid supply 184 and the first inlet 180; and a first sensor 113 configured to generate a first signal representing ambient condition proximal the first battery rack 111.

The system 100 further includes a first controller 130 configured to: receive the first signal from the first sensor 113; detect a first precursor condition to a fire event based on the first signal; and, in response to detecting the first precursor condition, trigger the first valve 182 to transition from a closed state to an open state.

1.1 Method

Figure 11:
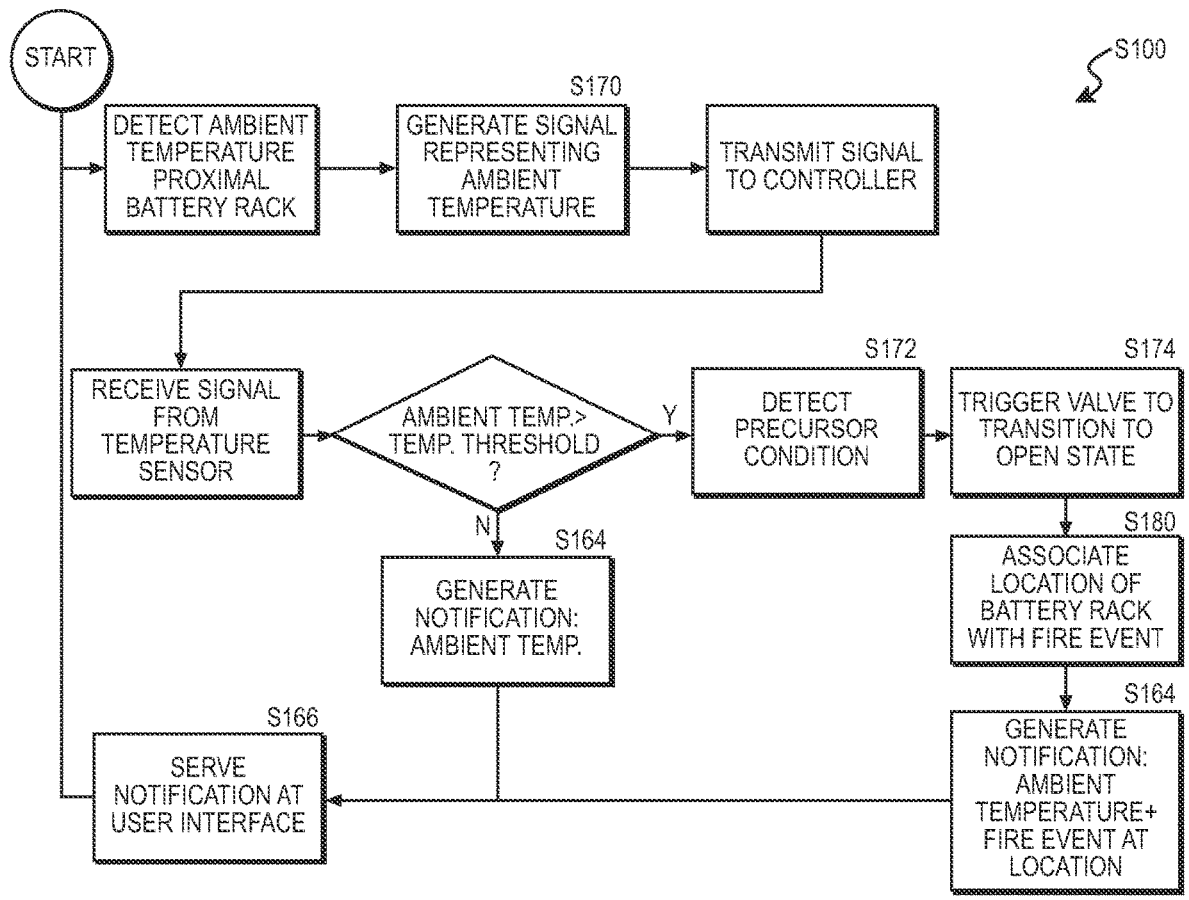
FIG. 11 is a flowchart representation of one variation of the method.

As shown in FIGS. 9A, 9B, and 11, a method S100 includes, at a first sensor 113 arranged on a first battery rack 111, generating a first signal representing ambient condition proximal the first battery rack 111 during a first time period in Block S170, the first battery rack 111 including: a first battery tray 120 configured to receive a first set of battery cells 122; and a first frame 170 configured to support the first battery tray 120. The first frame 170 includes: a first inlet 180 fluidly coupled to a fluid supply 184; a first column 172; and a second column 172. The first column 172 includes: a first set of perforations 178 arranged on the first column 172 and facing an interior of the first battery rack 111; and a first hollow body 186 fluidly coupled to the first inlet 180 and defining a first channel configured to circulate fluid from the first inlet 180 to the first set of perforations 178. The second column 172 includes: a second set of perforations 178 arranged on the second column 172 and facing the interior of the first battery rack 111; and a second hollow body 186 fluidly coupled to the first column 172 and defining a second channel configured to circulate fluid from the first column 172 to the second set of perforations 178.

The method S100 also includes, at a first controller 130: in response to receiving the first signal from the first sensor, detecting a first precursor condition to a fire event based on the first signal in Block S72; and, in response to detecting the first precursor condition, triggering a first valve 182 to transition from a closed state to an open state in Block S174, the first valve 182 interposed between the fluid supply 184 and the first inlet 180.

1.2 Variation: Passive Integral Battery Rack Cooling

Figure 10A:
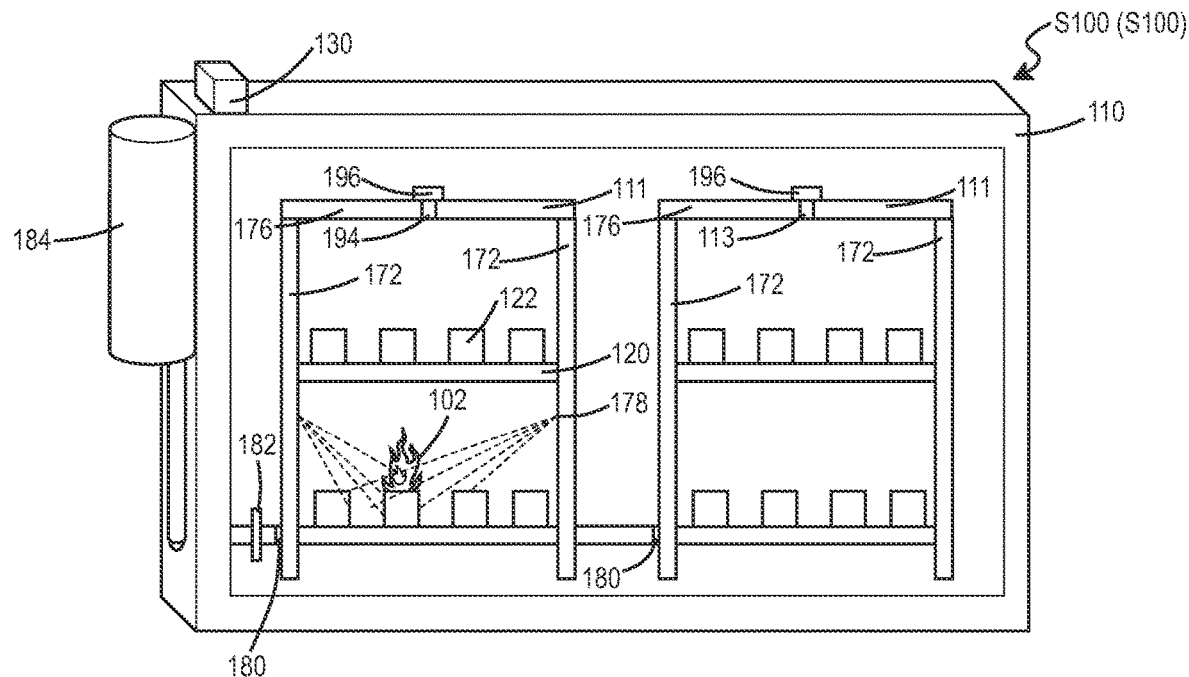
FIGS. 10A and 10B are schematic representations of one variation of the system.
Figure 10B:
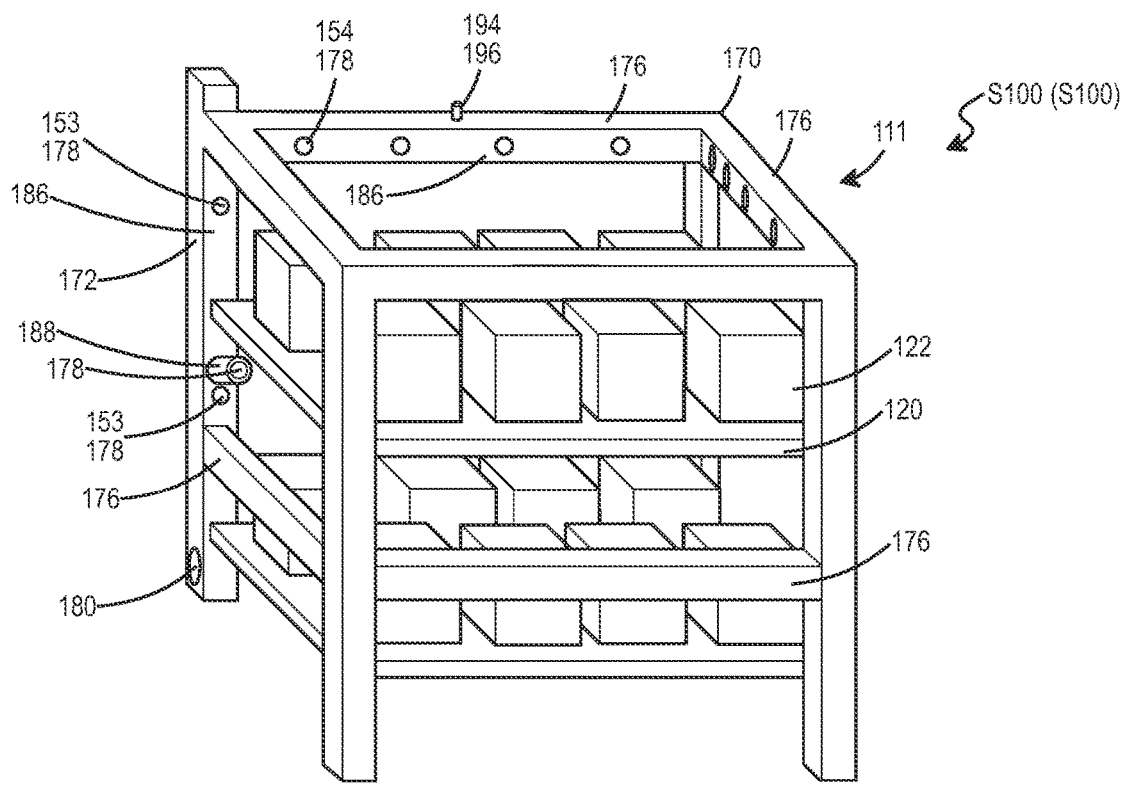

As shown in FIGS. 10A and 10B, one variation of the system 100 includes a battery rack 111 including: a first battery tray 120 configured to receive a first set of battery cells 120; and a frame 170 configured to support the first battery tray 120. The frame 170 includes: an inlet 180 fluidly coupled to a fluid supply 184; a first column 172; a second column 172; and a first brace 176 connecting the first column 172 to the second column 172. The first column 172 includes: a first set of perforations 178 arranged on the first column 172 and facing an interior of the battery rack 111; and a first hollow body 186 fluidly coupled to the inlet 180 and defining a first channel configured to circulate fluid from the inlet 180 to the first set of perforations 178. The second column 172 includes: a second set of perforations 178 arranged on the second column 172 and facing the interior of the battery rack 111; and a second hollow body 186 fluidly coupled to the first column 172 and defining a second channel configured to circulate fluid from the first column 172 to the second set of perforations 178. The first brace 176 includes: a third set of perforations 178 arranged on the first brace 176 and facing the interior of the battery rack 111; and a third hollow body 186 fluidly coupling the first column 172 to the second column 172 and defining a third channel configured to circulate fluid from the first column 172 to the third set of perforations 178.

This variation of the system 100 also includes: a valve 182 interposed between the fluid supply 184 and the inlet 180; a bimetallic element 194 selectively coupled to a circuit 196 based on a predefined temperature threshold; and the circuit 196 configured to trigger the valve 182 to transition from a closed state to an open state in response to an ambient temperature proximal the battery rack 111 exceeding the predefined temperature threshold.

2. APPLICATIONS

Generally, the system 100 is configured to: rapidly respond to an incidence of an ongoing fire event within a battery storage container 110 due to combustion of lithium-ion battery cells stored within the battery storage container 110; suppress the fire event; and mitigate the risks of heat propagation and secondary fire events due to the initial fire event. In particular, the system 100 can direct a fire suppression fluid (e.g., water, inert gas, fire suppression agent, or some combination thereof) to: suppress the ongoing fire event at a particular enflamed lithium battery cell; minimize the propagation of the fire to adjacent lithium battery cells within the battery storage container 110; and minimize the propagation of the fire to adjacent battery trays 120 storing additional lithium battery cells, or to adjacent battery storage containers 110. Furthermore, the system 100 can direct the fire suppression fluid to decrease the ambient temperature within the battery storage container 110 and minimize the risks of "thermal runaway" (i.e., when elevated temperatures accelerate an energy release by a lithium battery cell that further increases temperatures and can have cascading adverse effects on nearby lithium battery cells), which can otherwise produce an explosive environment within the battery storage container 110 and increase the probability of a secondary fire and/or explosion.

By decreasing temperatures within adjacent battery trays 120, the system minimizes the risk of thermal runaway propagation outside the battery tray 120 of origin by diminishing the ability of adjacent battery trays 120 to potential combustible gases or other thermal injury. By reducing the overall number of cells involved in a failure event, the overall quantity of combustible gases is also reduced, thereby reducing the overall thermal exposure to the adjacent cells. As described below in more detail, the system: suppresses any potential fires via the fire suppression fluid while simultaneously ventilating the battery trays 120 via ventilation systems so that the fire can be extinguished while the battery tray(s) 120 is being ventilated.

In another implementation, the system 100 is an enclosed apparatus—with a fluid storage tank storing the fire suppression fluid—that can be installed and secured within or external to various types of battery storage containers 110. The system 100 can aerosolize the fire suppression fluid such that the fluid behaves like a gas (i.e., suspended in air) and moves like a gas throughout the battery storage container 110 to: deposit on vertical, horizontal, and angled surfaces and in between the surfaces of the components of the energy storage system; and to interact with the lithium battery cells themselves. Thus, the system 100 can minimize an amount of fire suppression fluid required to suppress a fire and can provide fire suppression to battery storage containers 110 at locations where water and/or other fluid suppression agents are scarce, logistically difficult to coordinate, and/or prohibitively expensive to manage.

In another implementation, the system 100 can store battery cells 122 on a battery rack 111—connected to a fluid supply—including a hollow, perforated frame 170 (e.g., columns 172, braces 176) through which fluid may flow and expel onto the battery cells 122 in response to a precursor condition 102. More specifically, each column 172 of the battery rack 111 defines a channel through which fluid may flow and expel—from a set of perforations 178 on the column 172—in a variety of spray patterns toward the battery cells 122. Accordingly, the system 100 can integrally deliver fire suppression fluid to battery cells 122 via the battery rack 111, such as in response to a battery cell 122 exhibiting a precursor condition 102, thereby integrating a plumbing system into a support structure for containing the battery cells 122 in a battery storage container 110. Therefore, the system 100 can simplify assembly and maximize space efficiency within the battery storage container 110 by minimizing a total footprint of fire mitigation elements therein.

The system 100 can be installed in conjunction with additional systems 100 to create a network of systems 100 that can communicate with each other to prevent fire and heat propagation between adjacent battery storage containers 110 and can supplement fire suppression fluid (e.g., via connecting pipes) to adjacent systems as needed to suppress a fire event at a particular battery storage container 110. For example, a first system 100 of a first battery storage container 110 with an ongoing fire event can transmit a fire event warning prompt to a second system of an adjacent battery storage container 110 to activate a fire suppression response and facilitate cooling within the adjacent battery storage container 110 to decrease the ambient temperature and minimize thermal runaway between battery storage containers 110.

In one variation, the system 100 can: actively detect a potential fire event by monitoring outputs of multiple sensors—such as a light sensor, a humidity sensor, gas sensor, and/or a temperature sensor- and detecting changes in such measured ambient conditions; and, in response to detecting these changes, initiate a fire suppression response to cool the ambient environment within the battery storage container 110 and prevent the potential fire event.

In another implementation, the system 100 can detect a precursor condition 102 to an incipient explosion event, such as unexpected presence of a volatile gas during nominal operation of the system 100, or an increased concentration of a volatile gas known to be present during nominal operation at a lower concentration. In response to detecting the potential for an explosive event in the battery storage container 110, the system can trigger a door 115 or vent to open, venting the gas in the battery storage container 110 to the external atmosphere, and reducing the potential for an explosion. The system can include explosion mitigation systems independent of, or in conjunction with, fire detection and mitigation systems.

Generally, the system 100 is configured to detect a precursor condition 102 indicative of an incipient fire or explosion event particular to lithium-ion battery cells. The system 100 detects the precursor condition 102 at a time prior to development of a fire or explosion to execute a response to mitigate the precursor condition 102 and/or interrupt progression of the precursor condition 102 to a fire or explosion event. However, the system 100 can be configured to detect a precursor condition 102 indicative of an incipient fire event, explosion event, adverse chemical interaction, leak, and/or other event that may preempt a fire or explosive event and initiate an action to mitigate the precursor condition 102 and/or interrupt progression of the precursor condition 102 to a more destructive event.

2.1 Variation: Indoor Energy Storage Systems

As described herein, the system 100: stores battery cells 122 on a battery rack 111—connected to a fluid supply—within a battery storage container 110 and including a hollow, perforated frame 170 (e.g., columns 172, braces 176) through which fluid can flow and spray onto the battery cells 122 in response to a precursor condition 102; detects a precursor condition to a fire event; and integrally delivers fire suppression fluid to battery cells 122 via the battery rack 111 in response to detecting the precursor condition.

However, the system 100 can similarly: store battery cells 122 on a battery rack 111, connected to a fluid supply, within an indoor energy storage facility (e.g., within a building); detect a precursor condition to a fire event; and integrally deliver fire suppression fluid to battery cells 122 via the battery rack 111—within the indoor energy storage facility—in response to detecting the precursor condition.

3. HOUSING

Figure 1:
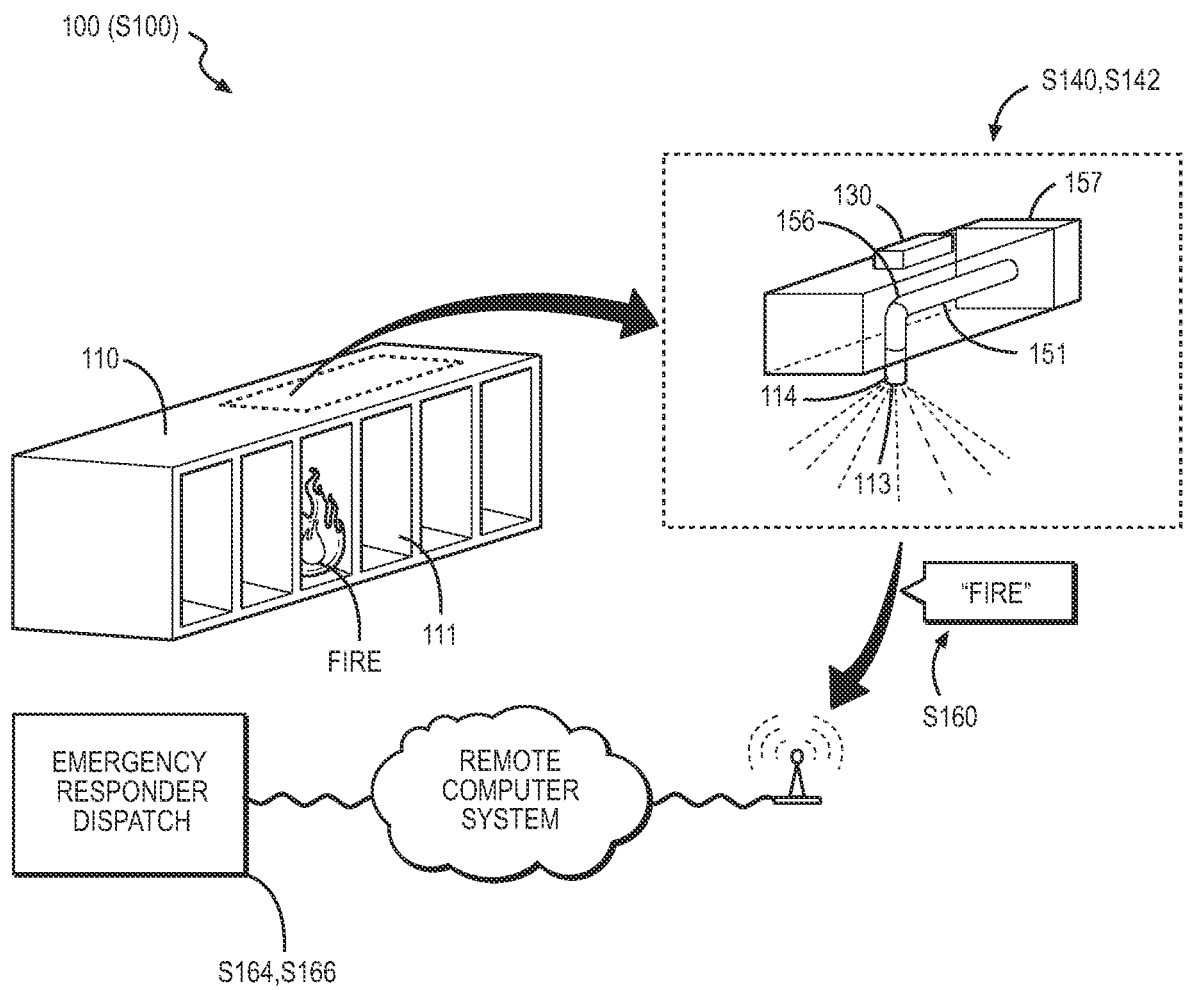
FIG. 1 is a schematic representation of one variation of a system.

In one implementation as shown in FIG. 1, the system 100 can include a housing formed of a unitary structure that defines the main body of the system 100. The housing can define: a base; a perimeter wall extending upwardly from the base; a cover disposed over the perimeter wall; a storage chamber bounded by the base, the perimeter wall, and the cover; a first opening for connecting the cooling channel 151 positioned within the storage chamber to the nozzle 114; and a second opening for connecting the cooling channel 151 to the fluid storage tank. Moreover, the housing can include a connector to a set of nozzles 114, a connector to the cooling plate subsystem, a connector to a fluid (e.g., water) storage tank, a connector to a supplemental fluid storage supply, as well as electronic and/or electromechanical connections to a controller 130, a power supply, and/or a reserve power supply. In one example, the housing can include a set of handles for lifting, moving, and/or positioning the system 100 (e.g., during installation of the system 100).

4. COOLING CHANNEL

As shown in FIG. 1, the system 100 can further include a cooling channel 151 positioned—or embedded—within the storage chamber of the housing. The cooling channel 151 can define: a proximal end connected to a port on the fluid storage tank; a distal end connected to the nozzle 114; and a lumen disposed between the proximal end and the distal end.

Alternatively, the cooling channel 151 can be embedded within a set of plates, each including: an inlet bringing fluid into the cooling plate from another cooling plate or the fluid supply; an outlet connecting the plate to another plate or returning the fluid to the fluid supply; an enclosed channel or plenum through which the fluid can flow from the inlet to the outlet, containing apertures 152 sealed with a meltable plug designed to fail at a specific temperature resulting in fluid distribution to the adjacent heated surface. Moreover, the cooling plates can have static or circulating fluid and can be monitored for pressure or flow to determine system activation.

In another variation, the cooling plates (and cooling channels 151) can connect independently to the fluid supply in series (e.g., multiple cooling plates connected via a single line to the fluid supply), and/or in parallel (e.g., multiple cooling plates independently connected via multiple lines to the fluid supply).

In another variation, the system 100 can include a set of cooling channels 151 that branch from the proximal end connected to the port of the fluid storage tank, each cooling channel 151 having a corresponding distal end connected to a corresponding nozzle 114. In this variation, a single system 100 can deliver the fluid at multiple directions within the battery storage container 110. Alternatively, the set of cooling channels 151 can individually connect to a corresponding port on the fluid storage tank (rather than branching from the same port).

Figure 6:
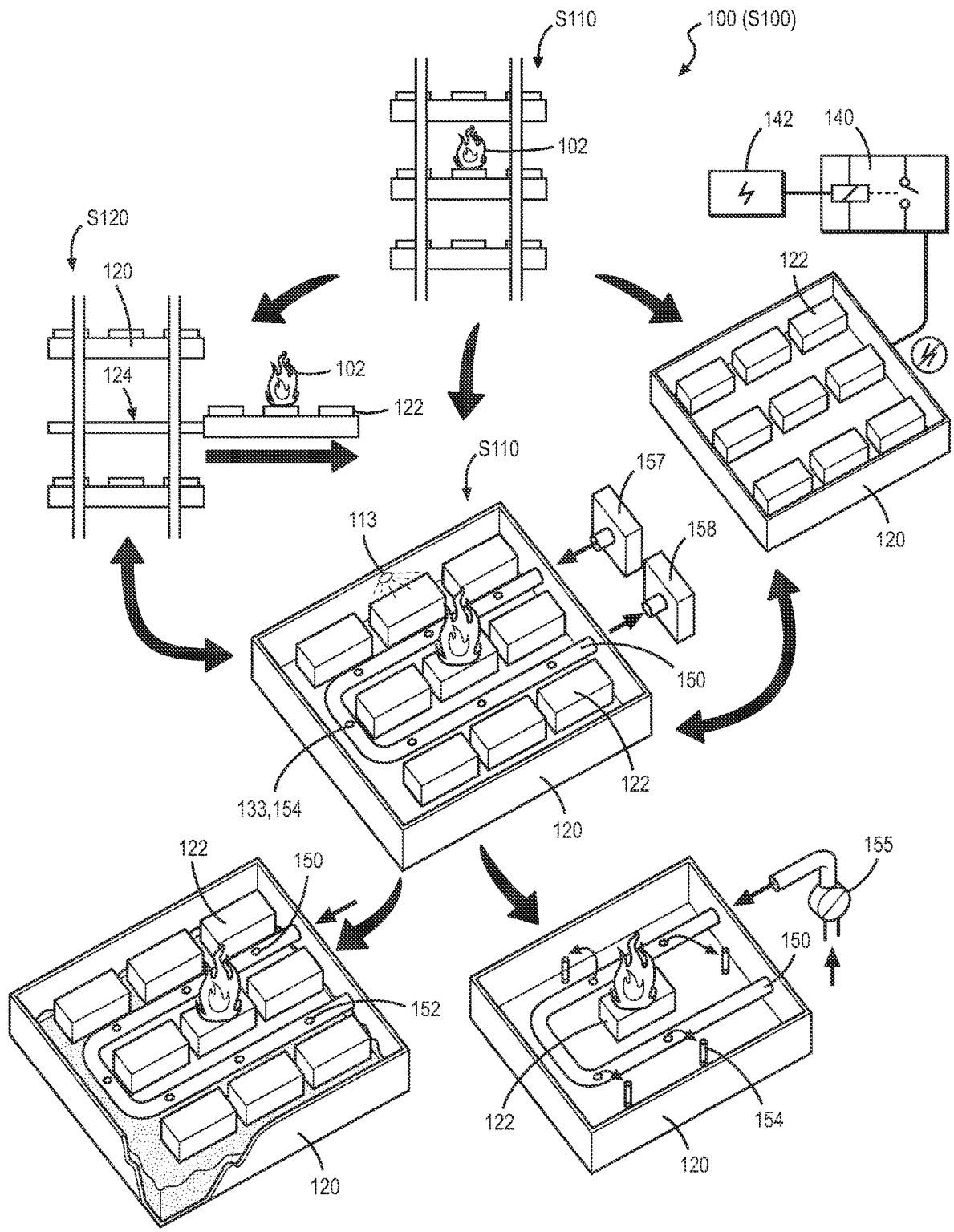
FIG. 6 is a flowchart representation of one variation of the method.

In one implementation, as shown in FIG. 6, the system 100 can include a set of cooling channels 151 arranged within an intercooler 150, the intercooler 150 arranged within a battery tray 120. The intercooler 150 is configured to receive fluid from a fluid supply, such as a supply manifold 157 or fluid storage tank, and circulate the fluid through the battery tray 120 to cool the set of battery cells 122 during nominal operation of the system 100. In one variation in which a set of battery trays 120 is arranged in a set of battery racks 111, each battery tray 120 including an intercooler 150, the system 100 can: be configured to detect a precursor condition 102 to an incipient fire event, such as an increase in temperature, in a first battery tray 120 in the set of battery trays 120; and, in response, increase the flow rate and/or pressure of fluid in the intercoolers 150 of the remaining battery trays 120 (not exhibiting the precursor condition 102) to increase cooling. By increasing cooling of the battery cells 122, the system can reduce or prevent the propagation of heat and/or developing fire conditions from the first battery tray 120 to an adjacent battery tray 120.

5. NOZZLE

The system 100 can include a nozzle 114 configured to direct a fluid spray pattern within the battery storage container 110 enclosing the set of battery cells 122. In one implementation, the nozzle 114 includes: a nozzle body; a nozzle lumen spanning between a proximal end and a distal end of the nozzle body; an inlet at the proximal end of the nozzle body and configured to fluidly connect the nozzle lumen to the distal end of the cooling channel 151; an outlet at the distal end of the nozzle body and positioned to direct fluid in the fluid spray pattern at a set of battery cells 122 within the battery storage container 110.

In one variation, a portion of the nozzle body is inset into the first opening of the housing such that the outlet of the nozzle 114 protrudes from the housing. In one example, the system 100 can be secured to a ceiling within the battery storage container 110, and the first opening of the housing can be located on a base of the housing such that the outlet of the nozzle 114 points downward out of the housing and perpendicular to a surface of a battery cell 122. In a variation of this example, the first opening can be located in the perimeter wall of the housing such that the outlet of the nozzle 114 points parallel to a surface of a battery cell 122.

The nozzle 114 can be designed to produce a particular spray pattern, spray angle, volumetric flow rate, and drop size distribution of the fluid exiting the outlet of the nozzle 114. In one implementation, the nozzle 114 can produce a volume median drop size (dv_50) of between 25 and 400 microns. In particular, the nozzle 114 can aerosolize the fluid such that the fluid behaves like a gas (i.e., suspended in air) and moves like a gas throughout the battery storage container 110 in order to deposit the fluid on vertical, horizontal, and angled surfaces, to get drawn in between the surfaces of the battery cells 122, and to interact with the battery cells 122 themselves. The nozzle 114 can be configured to deliver the fluid within the enclosure by generating droplets of an ideal drop size distribution (dv_50) and surface to volume ratio (d_32) via mechanical, pneumatic, or alternative drop formation techniques.

The nozzle 114 body can be configured to include multiple, different geometries, such as: a spiral nozzle, a convergent cone nozzle, and/or a flat fan nozzle. For example, the nozzle 114 can include a fire protection nozzle deflector design or multiple ejection ports to control spray dispersion. The nozzle body can also be configured to include similar variations in order to produce a hollow cone spray pattern, a jet spray pattern, a plume spray pattern, similar variations, or some combination thereof. The nozzle lumen can be configured to include multiple, different geometries such as: a varying cross-sectional area, a uniform cross-sectional area across the length of the nozzle body; and/or a set of vanes configured to cause turbulence within the nozzle lumen and atomize the fluid passing through the nozzle lumen.

In one variation, the system 100 can include a set of nozzles 114—of the same design or of varying design—configured to increase a volumetric flow rate of fluid into the battery storage container 110, thereby enabling an accelerated fire suppression response within the battery storage container 110.

6. SENSING & ACTIVATION

The system 100 can be configured to passively and/or actively respond to changes of the ambient environment (e.g., temperature, gas, humidity, light) within the battery storage container 110 and either passively or actively initiate a fire suppression response. For example, the system can be activated by detecting gas production, general smoke production, and/or specific gas constituents. Moreover, the system can also include a user interface (e.g., emergency switch or trigger) configured to activate in response to user input.

6.1 Precursor Conditions

As shown in FIGS. 1-2 and 4-7, the system 100 can be configured to identify precursor conditions 102 indicating a potential or incipient fire or explosive event. In particular, the system 100 can be configured to detect a precursor condition 102 indicating an incipient fire event unique to a particular battery cell type, such as a lithium-ion battery cell, based on the characteristics of the battery cell type (such as a particular temperature threshold for a particular cell type.) Generally, the system 100 can detect a precursor condition 102 in a particular battery tray 120 and/or be configured to detect the precursor condition 102 in a particular battery cell. The controller 130 can be configured to initiate a particular mitigation action in response to detection of the precursor condition 102, to suppress the precursor condition 102 in the battery tray 120, and thereby mitigate or prevent a fire from developing in the battery tray 120 and/or propagating to an adjacent battery tray 120.

In one variation, the system 100 can be configured to detect a precursor condition 102 to a fire event based on a detected temperature of the battery tray 120 compared to a threshold temperature. The controller 130 can be programmed with a threshold temperature greater than or equal to a nominal operating temperature of the battery cell 122 and less than or equal to an ignition temperature of the battery cell. A sensor 113 arranged within the battery tray 120 can be configured to detect the temperature of the set of battery cells 122 in the battery tray 120 in real time and, in response to the temperature of the battery tray 120 exceeding the threshold temperature, the sensor 113 can transmit a signal to the controller 130. In response to receiving the signal, the controller 130 can initiate a response action to suppress the elevated temperature in the battery tray 120, such as increasing cooling or releasing fluid into the battery tray 120. In one variation, a sensor 113 is arranged in contact with or proximal a particular battery cell 122 and configured to detect the temperature of that battery cell.

In one example in which the sensor 113 is configured to detect a temperature of a battery tray 120 and transmit a signal to a controller 130, the controller 130 can be configured to receive the signal from the sensor 113 and detect the temperature of the battery tray 120 exceeding a threshold temperature based on the signal, indicating a precursor condition 102 for an incipient fire event has been met for the set of battery cells 122 occupying the battery tray 120. In response, the controller 130 triggers a tray ejector 124 to transition the battery tray 120 from an inserted position to an extended position; and triggers a nozzle 114 arranged in the battery tray 120 to direct fluid into the battery tray 120 to suppress the precursor condition 102.

Therefore, the system 100 can be configured to detect various precursor conditions 102 preceding a fire event based on the battery cell type. In particular, the system 100 can be configured to detect a temperature increase beyond a temperature threshold. The system can implement fire mitigation actions to prevent heat propagation through the battery storage container 110 or to arrest or slow thermal runaway of the battery cell.

6.2 Passive Sensing & Activation

In one implementation, the system 100 can include a passive sensing and activation system for: detecting a probable fire within the battery storage container 110; and activating the system 100 in response to detecting the probable fire in order to suppress the fire and/or mitigate the spread of the fire. In particular, the system 100 can include a meltable plug arranged over each of the apertures 152 disposed within the cooling channel 151. The meltable plug 153 can be configured to melt and expose the aperture 152 in response to an ambient temperature surrounding the system 100 exceeding a threshold temperature. More specifically, the meltable plug 153 can be composed of a thermoplastic material that has a melting temperature at or near a minimum temperature of an active fire (e.g., approximately 200 degrees Celsius). Accordingly, in response to the ambient temperature approaching or exceeding 200 degrees Celsius, the meltable plug can melt and expose the aperture, thereby enabling the passage of fire suppression fluid from the fluid storage tank, through the cooling channel 151, thus directing the flow of fire suppression fluid toward the set of battery cells 122 within the battery storage container 110. Accordingly, the system 100 can discharge the fire suppression fluid in a fluid spray pattern toward the set of battery cells 122 in response to a specific change in ambient temperature indicative of an active fire within the battery storage container 110.

For example, as shown in FIG. 6, the cooling channel 151 can: define a set of apertures 152 configured to release fluid from the cooling channel 151 into the first battery tray 120; and include a set of meltable plugs 153, each meltable plug in the set of meltable plugs 153 configured to insert into an aperture in the cooling channel 151, seal the aperture when a temperature of the first battery tray 120 is maintained below a threshold temperature, thereby retaining fluid within the cooling channel 151, and melt in response to the temperature in the first battery tray 120 exceeding a threshold temperature, thereby releasing the fluid into the first battery tray 120.

Therefore, the system 100 can cool the set of battery cells 122 within a battery tray 120 under nominal operating conditions, and direct fluid into the battery tray 120 in response to a precursor condition 102 utilizing the intercooler 150.

In a variation of this example, the meltable plugs 153 are resistant to high pressure and will expose the aperture 152 in the cooling channel 151 when exposed to an elevated temperature, but not when exposed to an elevated pressure in the cooling channel 151. In this variation, the intercoolers 150 including meltable plugs 153 are arranged in each battery tray 120 in a set of battery trays 120. A first battery tray 120 exhibits a precursor condition 102 defining an elevated temperature and, in response, the meltable plugs 153 in the apertures 152 of the intercooler 150 in the first battery tray 120 melt, releasing fluid into the first battery tray 120. The system 100 increases the fluid pressure in the remaining intercoolers 150 to increase cooling within the remaining battery trays 120 not exhibiting elevated temperatures, without ejecting the meltable plugs 153. The increased cooling in the remaining battery trays 120 slows or prevents propagation of heat from the first battery tray 120 exhibiting the elevated temperature to an adjacent battery tray 120. In the event the heat propagation overwhelms the cooling in the adjacent battery tray 120, the meltable plugs 153 melt, exposing the apertures 152 of the cooling channel 151. Fluid is then directed into the adjacent battery tray 120 via the exposed apertures 152 to further increase cooling in the adjacent battery tray 120.

In another implementation, the system 100 can further include a passive electrical disconnect 140 configured to sever an electrical connection between a power bus 142 and the set of battery cells 122 in response to detecting a precursor condition 102. Electrically disconnecting a battery cell 122 exhibiting a precursor condition 102 mitigates thermal runaway in the battery cell 122 by preventing additional current flowing to the battery cell, thereby reducing the rate of temperature increase in the battery cell. Electrically disconnecting the battery cell 122 further reduces or eliminates the possibility of short circuits and/or other injury to additional electrical circuits or other battery cells 122 due to interaction between live electrical circuits and fire suppression fluid, particularly when the battery cell 122, exhibiting the precursor condition 102, is immersed in or exposed to fire suppression fluid, such as when fire suppression fluid is directed into the battery tray 120.

In one example as shown in FIG. 6, the system 100 can include: a power bus 142 arranged proximal the battery rack 111; and an electrical disconnect 140 electrically coupled to and interposed between the power bus, and the set of battery cells 122 within a battery tray 120. The electrical disconnect 140 can be configured to: electrically couple the power bus 142 to the set of battery cells 122 in a coupled state; physically and electrically disconnect the power bus 142 from the set of battery cells 122 in a decoupled state, thereby isolating the battery cell; and transition from the coupled state to the decoupled state in response to ejection of the battery tray 120 from the battery rack 111.

Therefore, the system 100 can passively: detect a precursor condition 102 in a set of battery cells 122 occupying a battery tray 120; and, in response to detection of the precursor condition 102, automatically execute mitigation steps to suppress the precursor condition 102. The system 100 can combine passive systems to: detect a precursor condition 102, cool a battery cell, expose a battery cell 122 directly to fire suppression fluid, sever an electrical connection to the battery cell, and isolate a battery tray 120. Passive systems can be combined to define an automatic detection and mitigation system requiring no power or input; and/or be combined with active systems to provide redundancy to active systems and/or reduce complexity by replacing active systems requiring power or input.

6.3 Active Sensing & Activation

The system 100 can include an active sensing and activation system for: detecting a probable fire within the battery storage container 110; and activating the system 100 in response to detecting the probable fire in order to suppress the fire and/or mitigate the spread of the fire. In particular, the system 100 can include: a sensor 113 (e.g., a temperature, humidity, and/or light sensor 113) configured to detect a change in ambient conditions within the battery storage container 110; and an electro-mechanical valve (e.g., a directional control valve 156, a bi-stable valve) configured to open and release fire suppression fluid to flow from the fluid storage tank, through the cooling channel 151, and through the nozzle 114 directing the flow of fire suppression fluid toward the set of battery cells 122 within the battery storage container 110. In this implementation, the controller 130 can be configured to activate the electro-mechanical valve to open in response to the sensor 113 detecting the change in ambient conditions within the battery storage container 110 exceeding a threshold (e.g., a change in temperature exceeding 100 degrees Celsius). The electro-mechanical valve can be positioned in-line at the proximal end of the cooling channel 151 near the fluid storage tank or at the distal end of the cooling channel 151 near the nozzle 114. When inactive, the electro-mechanical valve can remain in a default closed state to prevent the passage of fluid through the system 100. Accordingly, the system 100 can discharge the fire suppression fluid in a fluid spray pattern directing the flow of fire suppression fluid toward the set of battery cells 122 in response to detecting a fire within the battery storage container 110.

6.3.1 Overhead Sensor

In one implementation, the system 100 can include a sensor 113 arranged within the battery storage container 110 external to the battery racks 111 and battery trays 120. The sensor 113 can define an infrared sensor, thermal imaging sensor, remote temperature sensor, light sensor, or another sensor. The sensor 113 can be configured to detect global ambient conditions within the battery storage container 110, or be configured to detect conditions in a particular battery rack 111 or battery tray 120 within the battery storage container 110.

In one example, the system 100 can include the sensor 113 arranged external to a battery rack 111, such as arranged on a ceiling of the battery storage container 110 and configured to detect a temperature within a battery tray 120 inserted into the battery rack 111.

In one variation, a set of overhead sensors 113 are placed within the battery storage container 110 to provide an overlapping field of view, and/or redundancy to sense precursor conditions 102 within the battery storage container 110. In another variation, a set of overhead sensors can be installed in addition to sensors 113 arranged within battery trays 120 to supplement detection of precursor conditions 102.

Therefore, a single sensor 113 or array of sensors can be arranged within the battery storage container 110 external to the battery trays 120 and battery racks 111, such as in an overhead configuration, to detect precursor conditions 102. The external sensor can be a simple temperature sensor configured to detect ambient conditions within the battery storage container 110, or a thermal imaging sensor configured to detect a precursor condition 102 in an individual battery tray 120. The external sensor can be installed as a retrofit in an existing battery storage container 110, or as a supplement to individual sensors arranged within battery trays 120.

6.3.2 Directional Control Valve

In one implementation as shown in FIG. 1, the system 100 can include a directional control valve 156 fluidly coupled to and interposed between: a supply manifold 157 configured to supply fluid and an intercooler 150; and the supply manifold 157 and a nozzle 114. The directional control valve 156 is configured to: in a first state, receive fluid from the supply manifold 157 and direct fluid to the intercooler 150; and, in a second state, receive fluid from the supply manifold 157 and direct fluid to the nozzle 114. In this implementation, triggering the nozzle 114 to direct fluid into the battery tray 120 is effected by controlling the directional control valve 156 to transition from the first state to the second state, thereby directing fluid from the supply manifold 157 to the nozzle 114.

The directional control valve 156 enables the system 100 to actively change the routing of fluid from the intercooler 150 to the nozzle 114 in response to a detected precursor condition 102. In one implementation, wherein a set of battery cells 122 requires active cooling, the directional control valve 156 can direct fluid to the intercooler 150 to maintain the set of battery cells 122 at a nominal operating temperature at a first time. At a second time, in response to an elevated temperature detected in the tray, the controller 130 can control the directional control valve 156 to transition to the second state directing the fluid into the battery tray 120 via the nozzle 114 to cool the set of battery cells 122. The directional control valve 156 can be controlled independently of or in conjunction with ejection of the battery tray 120. In one variation, the directional control valve 156 can be controlled to switch from directing fluid to the intercooler 150 to directing fluid to the nozzle 114 in response to ejection of the battery tray 120, as opposed to detection of the precursor condition 102.

In one variation in which the first battery tray 120 is configured to extend from the battery rack 111 and receive fluid, the first battery tray 120 further includes a seal, arranged at an end of the first battery tray 120 proximal the battery rack 111 when the first battery tray 120 is in the extended position, and configured to prevent fluid from passing through a gap between the first battery tray 120 in the extended position and the battery rack 111, thereby preventing fluid from escaping the first battery tray 120 and flowing into a second battery tray 120 arranged below the first battery tray 120 in the battery rack 111. The seal prevents fluid passing through the gap to reduce or prevent potential damage to other sets of battery cells 122 in other battery trays 120 arranged within the battery rack 111 caused by interaction with the fluid, and enables the system 100 to maintain electrical connection to other sets of battery cells 122 in other battery trays 120 in the battery rack 111 not exhibiting the precursor condition 102, thereby reducing the risk of short circuit due to electrical interaction between electrical components and the fluid, and preserving a greater amount of energy storage capacity of the system 100.

6.3.3 Secondary Pump & Active Fluid Release

In one implementation as shown in FIG. 6, in which the system 100 includes an intercooler 150 configured to circulate fluid through the battery tray 120, the intercooler 150 further includes: a cooling channel 151 defining a set of perforations configured to release fluid from the cooling channel 151 into the first battery tray 120; and a set of pressure sensitive plugs 154. Each pressure sensitive plug 154 is configured to: insert into a perforation in the cooling channel 151; seal the perforation when a pressure of fluid in the cooling channel 151 is below a threshold pressure, thereby retaining the fluid in the cooling channel 151; and eject from the perforation in response to the pressure of fluid in the cooling channel 151 increasing to greater than the threshold pressure, thereby releasing fluid into the first battery tray 120. In one variation of this implementation, the system can further include a dedicated pump, fluidly coupled to the intercooler 150, and configured to increase the pressure of fluid in the cooling channel 151 above the threshold pressure in response to detection of the precursor condition 102. The controller 130 can be configured to trigger the dedicated pump 155 to activate, thereby increasing the pressure in the cooling channel 151 above the threshold pressure and ejecting the set of pressure sensitive plugs 154 in response to a signal received from a sensor 113.

Therefore, the system 100 can cool the set of battery cells 122 within a battery tray 120 under nominal operating conditions, and direct fluid into the battery tray 120 in response to a precursor condition 102 utilizing the intercooler 150 without a secondary component.

6.3.4 Active Electrical Disconnect

In one implementation, as shown in FIG. 6, the system 100 includes an active electrical disconnect 140 configured to disconnect a set of battery cells 122 exhibiting a precursor condition 102 and/or a fire event from additional electrical circuits in the system 100. The active electrical disconnect 140 can define a relay, transistor, or other electrically operable switch capable of severing an electrical connection in response to receiving a signal from the controller 130. Generally, the active electrical disconnect 140 is a relay configured to electrically isolate the power bus 142 from the set of battery cells 122 exhibiting the precursor condition 102. However, in an implementation in which a faster switching speed is required, the electrical disconnect 140 can be a transistor or other suitable electrically operable switch. Actively disconnecting the battery cell 122 exhibiting a precursor condition 102 can be implemented independent of other mitigation actions (e.g., ejecting the battery tray 120, directing fluid into the battery tray 120) to mitigate thermal runaway in the battery cell 122 by preventing additional current flowing to the battery cell, thereby reducing the rate of temperature increase in the battery cell.

In one example, the system 100 includes the power bus 142 arranged in the battery rack 111 adjacent the battery tray 120, and an electrical disconnect 140 interposed between the power bus 142 and the set of battery cells 122 within the battery tray 120 configured to: electrically couple the power bus 142 to the set of battery cells 122 in a coupled state; electrically disconnect the power bus 142 from the set of battery cells 122 in a decoupled state; and transition from the coupled state to the decoupled state. The controller 130 is configured to trigger the electrical disconnect 140 to transition from the coupled state to the decoupled state in response to detection of the precursor condition 102 in the first battery tray 120. In this example, the electrical disconnect 140 remains physically coupled to the power bus 142 and the set of battery cells 122 in the battery tray 120, but severs the electrical connection, electrically isolating the power bus 142 from the set of battery cells 122. In one variation in which the set of battery cells 122 in the tray is replaced with a new set of battery cells 122, the electrical disconnect 140 can be reset (i.e., recoupled) when the set of battery cells 122 is replaced, as opposed to replacing a destructive electrical disconnect 140 in addition to replacing the set of battery cells 122. Therefore the electrical disconnect 140 can be re-used, reducing the number of components necessary to replace following execution of a mitigation action. In another variation, the electrical disconnect 140 can be controlled by the controller 130 to electrically re-couple the power bus 142 to the set of battery cells 122 in the event the controller 130 detects a false-positive precursor condition 102. Therefore the controller 130 can automatically restore electrical storage capacity of the system in the event a false-positive precursor condition 102 is detected, and the false-positive characteristic is verified by the controller 130, such as by comparing the false-positive signal to signals from other sensors 113 indicating nominal conditions.

In another example, the controller 130 can be configured to, at a first time, detect a precursor condition 102 in a battery tray 120 based on a first signal received from a sensor 113 arranged in the battery tray 120, the first signal indicating an increase in temperature within the battery tray 120 exceeding a first threshold temperature. In response to detecting the precursor condition 102, the controller 130 can trigger the electrical disconnect 140 to sever the electrical connection between the power bus 142 and the set of battery cells 122. The controller 130 can then, at a second time following the first time, receive a second signal from the sensor 113 indicating the temperature within the battery tray 120 falling below a second threshold temperature and based on the second signal, detect that the precursor condition 102 is suppressed within the first battery tray 120. Alternatively, at the second time, the controller 130 can receive a third signal from the sensor 113 indicating the temperature in the battery tray 120 exceeding a third threshold temperature greater than the first threshold temperature and, in response, detect that thermal runaway is occurring in the battery cell 122 and/or a fire is imminent in the battery tray 120. In response, the controller 130 can initiate additional mitigation actions such as: triggering the battery tray 120 to eject from the battery rack 111; controlling the directional control valve 156 to switch states to direct fluid to the nozzle 114; and/or triggering the overhead fire suppression system to direct fluid into the battery tray 120.

7. FLUID STORAGE TANK

In one implementation, the system 100 can include a fluid storage tank that stores a volume of fluid configured to suppress a fire and/or mitigate a spread of the fire when the fluid is sprayed within the battery storage container 110. As used herein, the term fluid can include liquids or gases that can be stored and dispersed in liquid or gaseous/vapor form. The fluid can include water, a clean agent (e.g., an inert gas, a combination of inert gases), aerosol, a water-based solution including a water additive, or some combination thereof that can be dispersed in a vapor or gaseous form throughout the battery storage container 110.

Generally, the system 100 can include a valve for connecting directly to a water supply source provided by a fire department. In this variation, the fire department can provide an additional source of water (e.g., via a fire truck dispatched to a location of the battery storage container 110 in response to a fire alert and/or a nearby fire hydrant), and the system 100 can direct the water within the battery storage container 110, thus providing direct access to the source of the fire. Moreover, the system 100 can connect directly to local or private water mains or complementary sources associated with the building in which the battery storage container 110 is located.

In a variation, the system 100 can draw fluid from a set of fluid storage tanks between adjacent containers by, for example, connecting a set of tubes from the fluid storage tanks of a second system 100 on a second battery storage container 110 and a third system 100 on a third battery storage container 110 to the fluid storage tank of the first system 100. Accordingly, the system 100 can draw additional fluid as needed from fluid storage tanks attached to containers without a current fire and redirect the fluid toward the battery storage container 110 with a current fire.

8. POWER & PUMP

The system 100 can further include a pump 155 connected to the fluid storage tank and configured to draw fluid out of the fluid storage tank, into the cooling channel 151, and out of the outlet of the nozzle 114. More specifically, system 100 can include a fluid pump 155 (e.g., a water pump) and a separate fan to create a partial vacuum and draw fluid out of the fluid storage tank. Generally, the pump 155 can supply the nozzle 114(s) with fluid from the fluid storage tank and the cooling channel 151 with fluid from the fluid storage tank in response to system activation. Moreover, the pump 155 can also circulate the fluid through the cooling channel 151 to disperse heat (e.g., active fluid cooling) from adjacent cells.

In one variation, the system 100 can draw fluid out of the fluid storage tank by relying on pressure differentials between the fluid storage tank and the ambient atmosphere. For example, the fluid storage tank can be pressurized, such that, when the nozzle 114 outlet is opened—via a valve release or a melted plug—the fluid can be drawn toward the lower pressure environment within the battery storage container 110 and automatically disperse fluid in vapor or gaseous form from the fluid storage tank and out of the nozzle 114 outlet.

In addition, the system 100 can include a power source configured to provide power to the pump 155 and/or the controller 130. Alternatively, the system 100 can include an electrical connection configured to connect the system 100 to the set of battery cells 122 within the battery storage container 110 in which the system 100 is installed.

8.1 Integration with Overhead Fire Suppression System

Figure 5:
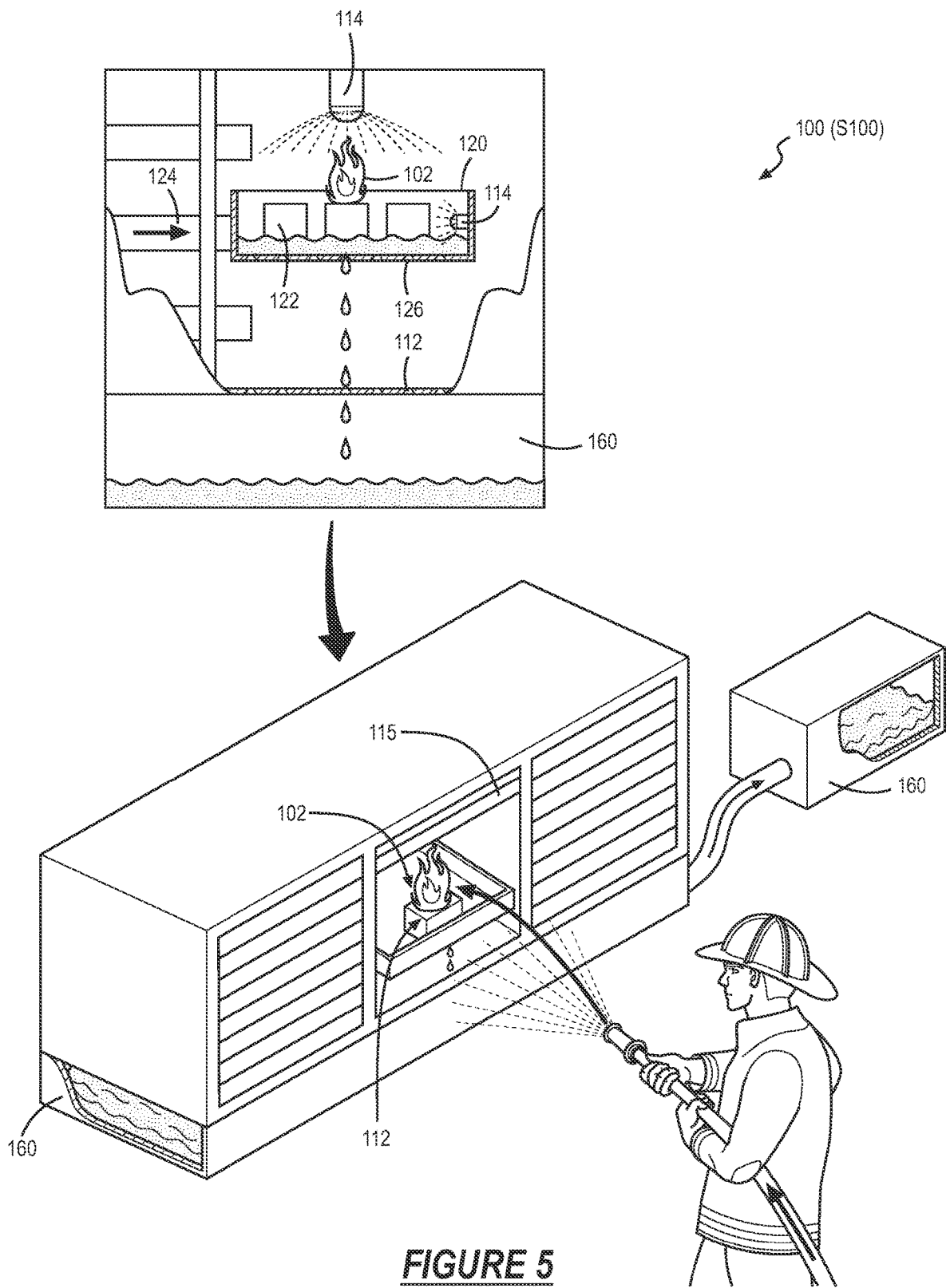
FIG. 5 is a flowchart representation of one variation of the method.

In another implementation, as shown in FIG. 5, the system 100 can be integrated into a battery storage container 110 equipped with an overhead fire suppression system. The battery rack 111 can be arranged to eject a battery tray 120 from the battery rack 111 and into a position beneath a fire suppression nozzle 114 arranged overhead, such as described in U.S. patent application Ser. No. 17/843,212.

Therefore, the system 100 can be integrated into a battery storage container 110 equipped with an existing fire suppression system. The controller 130 can be configured to activate individual nozzles 114 or extend individual battery trays 120 into position to receive fluid from overhead nozzles 114. The system 100 can utilize non-destructive mitigation actions to reduce or eliminate the number of components damaged as a consequence of the mitigation action, rather than the fire event, and reduce the number of components necessary to replace following a fire suppression event to only the components directly damaged by battery cell 122 failure or the fire event itself.

9. CONTROLLER

As noted above, in one variation, the system 100 can include a controller 130 configured to: monitor ambient conditions within the battery storage container 110 based on sensor 113 data; activate a fire suppression response in response to a possible fire event; release latching mechanisms; and generate and transmit a set of warning prompts associated with the fire event to a remote monitoring system and/or a fire department.

9.1 Sensor Integration and Signal Interpretation

Generally as shown in FIG. 1, the controller 130 is configured to: receive a signal from a sensor 113 arranged in the battery storage container 110 and interpret the signal to detect a precursor condition 102. The controller 130 is configured to initiate actions to mitigate or suppress the precursor condition 102 in a particular battery tray 120, set of battery trays 120, or in the battery storage container 110 as a whole in response to the signal (or signals) received.

Therefore, the system 100 can define an active system including a controller 130 configured to receive and interpret a set of signals from a set of sensors 113 arranged within the battery storage container 110, interpret the set of signals to detect presence or propagation of a precursor condition 102 in a particular location in the battery storage container 110, and initiate a targeted response action based on the precursor condition 102. The controller 130 can be configured to trigger additional system components to effect increasingly potent mitigation actions in the battery storage container 110.

9.2 Monitoring and Activation

In another variation, the controller 130 can be configured to activate the valve to open and activate the pump 155 in response to the sensor 113 detecting the change in ambient conditions within the battery storage container 110 exceeding a threshold (e.g., a change in temperature exceeding 100 degrees Celsius).

Thus, the controller 130 can: detect an increase in ambient temperature indicative of a potential fire event; and activate the fire suppression response in response to the detected increase in ambient temperature to prevent a possible fire event within the battery storage container 110. Moreover, the controller 130 can: detect an increase in ambient temperature indicative of an ongoing fire event; and activate the fire suppression response in response to the detected increase in ambient temperature to suppress the ongoing fire event within the battery storage container 110 and mitigate heat propagation to adjacent battery storage battery trays 120, units, or containers.

In one variation, the controller 130 can be integrated into the system 100 thereby forming a closed-loop control circuit within the system 100. In another variation, the controller 130 can be remotely networked into a system 100 or a set of systems 100 such that the controller 130 can: receive multiple inputs from multiple sensor 113s within the set of systems 100; and control an optimized response to a potential fire by each of a set of systems 100 in response to a sensor 113 detecting a potential fire event. For example, a remotely networked controller 130 can control a response to a sensor 113 detecting a potential fire event in a first system 100 of the set of systems 100 by routing fluid resources to a container in which a potential fire event is sensed from a container(s) in which a fire event is not sensed. Additionally or alternatively, the remotely networked controller 130 can be configured as a subsystem within a larger emergency management architecture.

9.5 Warning Prompts

Figure 8:
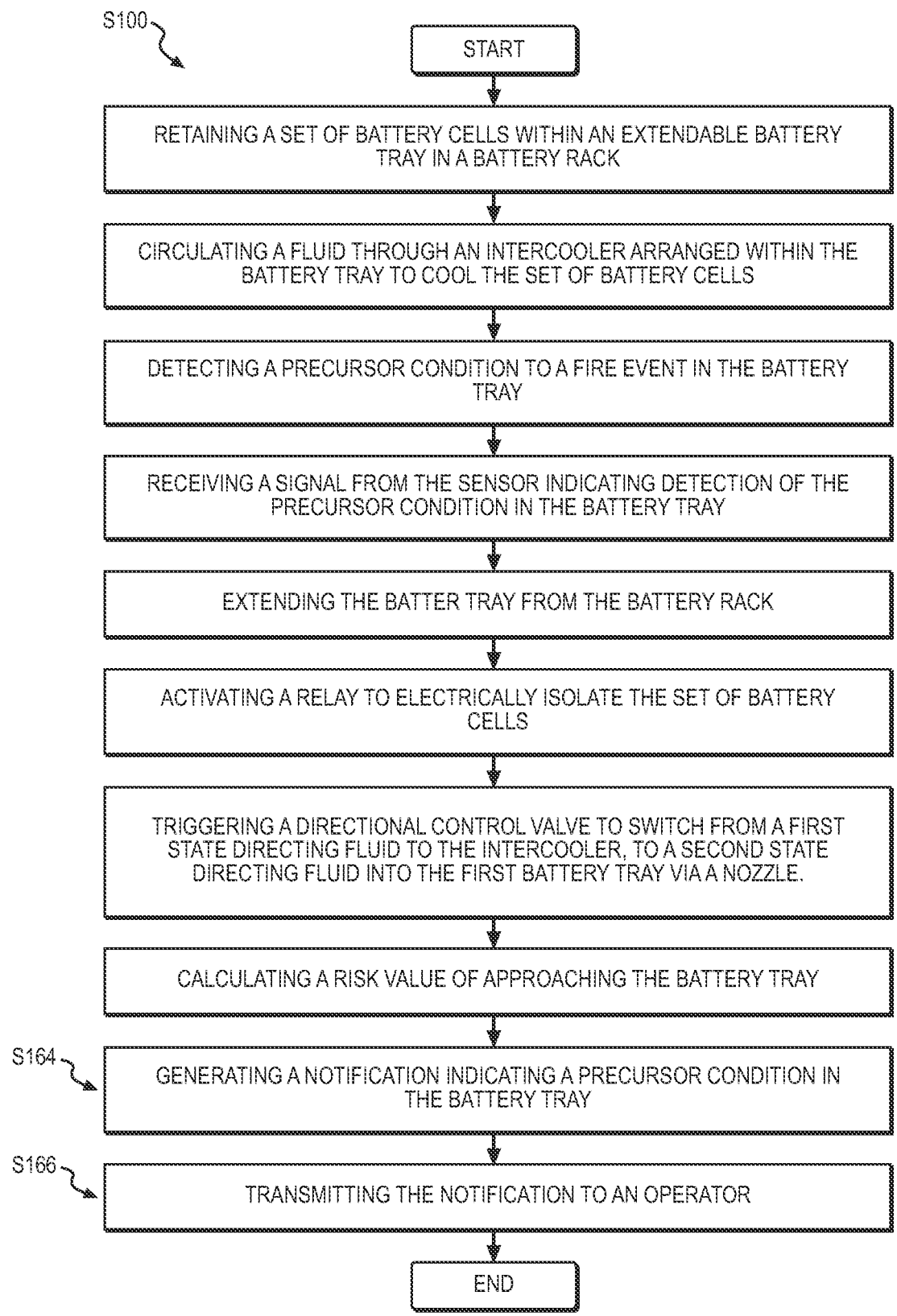
FIG. 8 is a flowchart representation of one variation of the method.

In one variation, as shown in FIGS. 1 and 8, the controller 130 can be configured to transmit a warning prompt to a remote monitoring system to alert an operator of a potential and/or active fire event within a battery storage container 110.

In this variation, the system 100 can further include a sensor 113 (e.g., a temperature, humidity, gas, and/or light sensor 113) configured to detect a change in ambient conditions within the battery storage container 110, wherein the controller 130 can be configured to transmit the warning prompt to the remote monitoring system in response to a sensor 113 detecting the change in ambient conditions.

Additionally or alternatively, the system 100 can further include a flow detection sensor 113 configured to detect a flow of fluid through the cooling channel 151/plate and/or the nozzle 114, wherein the controller 130 is configured to transmit the warning prompt to the remote monitoring system in response to the flow detection sensor 113 detecting the flow of fluid through the nozzle 114. For example, if the sensor 113 detects the flow of fluid through the nozzle 114 in a passive response configuration of the system, then the controller 130 can: identify that the plug has melted and therefore there is a significant change in temperature in the vicinity of the nozzle 114; and, in response, transmit the warning prompt to the remote monitoring system indicating a potential fire event.

Moreover, the controller 130 can be configured to: automatically alert and/or dispatch a fire department to a location of the battery storage container 110; and/or activate a set of systems 100 on or in adjacent battery storage containers 110 (i.e., to prevent spread of an active fire event). Alternatively, the controller 130 can be configured to: transmit the warning prompt; transmit information associated with the fire event (e.g., a location of the battery storage container 110, sensor 113 data); and display these options described above on a user interface of the remote monitoring system, thereby enabling the operator to select a set of actions based on the fire event information.

11. BATTERY TRAY & CONTAINER CONFIGURATION

In another example implementation, the system 100 can be integrated within a device and/or system containing a set of battery cells 122. For example, the system 100 can be fully integrated within the battery storage container 110 enclosing the set of battery cells 122. In this example, the battery storage container 110 can include: a fluid storage tank for storing a volume of fire suppression fluid and mounted within the battery storage container 110; a cooling channel 151 mounted across an internal surface of the battery storage container 110 and having a lumen disposed between a proximal end and a distal end of the cooling channel 151, the proximal end connected to the fluid storage tank; a nozzle 114 positioned at the distal end of the cooling channel 151, the nozzle 114 including an inlet connected to the cooling channel 151 and an outlet positioned to direct a fluid spray pattern toward the set of battery cells 122; a meltable plug arranged over the outlet of the nozzle 114 and configured to melt and expose the outlet in response to an ambient temperature surrounding the system exceeding a threshold temperature; a flow detection sensor 113 configured to detect a flow of fluid from the fluid storage tank, into the cooling channel 151, and out of the outlet of the nozzle 114; and a controller 130 configured to, in response to the flow detection sensor 113 detecting the flow of fluid through the outlet of the nozzle 114, transmit a warning prompt to a remote monitoring system. Moreover, the battery storage container 110 can include a set of cooling channel 151s—each fluidly connected to the fluid storage tank—with a corresponding set of nozzle 114s mounted across the internal surfaces of the battery such that the set of nozzle 114s can direct a fluid spray pattern at different locations (e.g., top portion, bottom portion, side surfaces, corners) within the battery storage container 110. Additionally, the battery storage container 110 can include a valve inset into a wall of the battery storage container 110 such that an external fluid supply can be connected—via a pipe or hose—to supplement the fluid stored within the integrated fluid storage tank.

Further, a set of battery storage containers 110 within an integrated system 100 can be arranged into an array of battery storage containers 110 within a field (i.e., a "multi-container field"). For example, a pipe or hose can connect a first valve on a first battery storage container 110 and a second valve on a second battery storage container 110. In another example, a controller 130 of a first battery storage container 110 and a controller 130 of a second battery storage container 110 can directly or remotely communicate, such that the controller 130 of the first battery storage container 110 with an ongoing fire event can transmit a fire event warning prompt to the controller 130 of the second battery storage container 110 in order to activate a fire suppression response and facilitate cooling within the second battery storage container 110. Accordingly, each battery storage container 110 can be linked to adjacent battery storage containers 110 to: supplement fluid to battery storage containers 110 with active fire events; activate the integrated fire suppression system of battery storage containers 110 adjacent a battery storage container 110 with an active fire event; and mitigate the spread of the fire and heat.

11.1 Waste Tank

Figure 3:
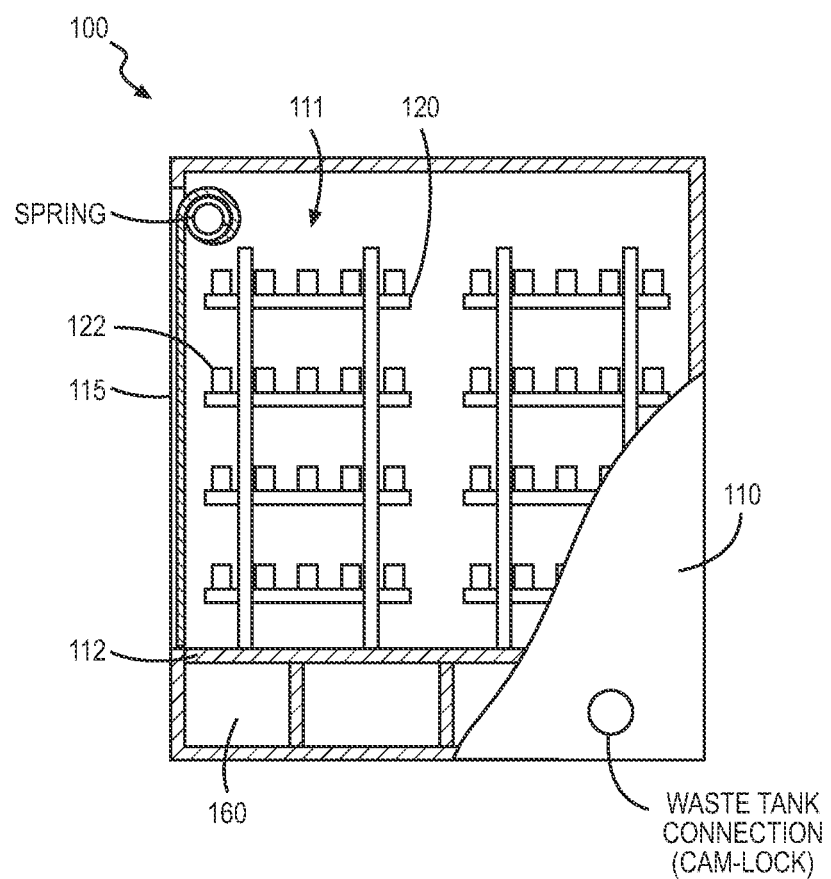
FIG. 3 is a schematic representation of one variation of the system.
Figure 4:
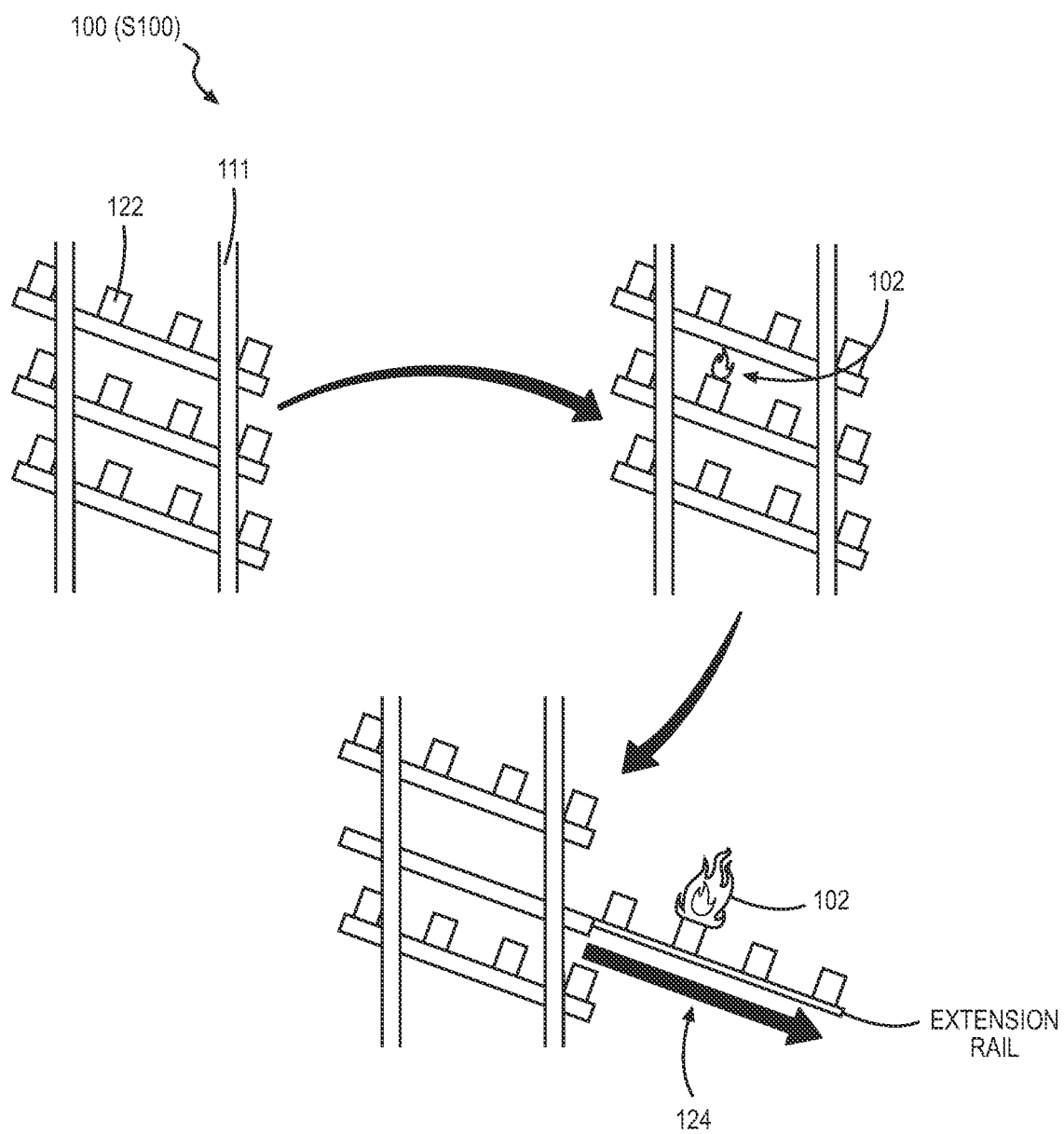
FIG. 4 is a flowchart representation of one variation of the method.

As shown in FIGS. 3 and 5, The system 100 can further include an integral waste tank 160 located within the battery storage container 110—such as in the bottom of the battery storage container 110 and between the base and the floor of the storage chamber—and configured to collect fluid runoff from fluids deposited within the storage chamber in response to a fire event.

12. EXPLOSION MITIGATION

Figure 2:
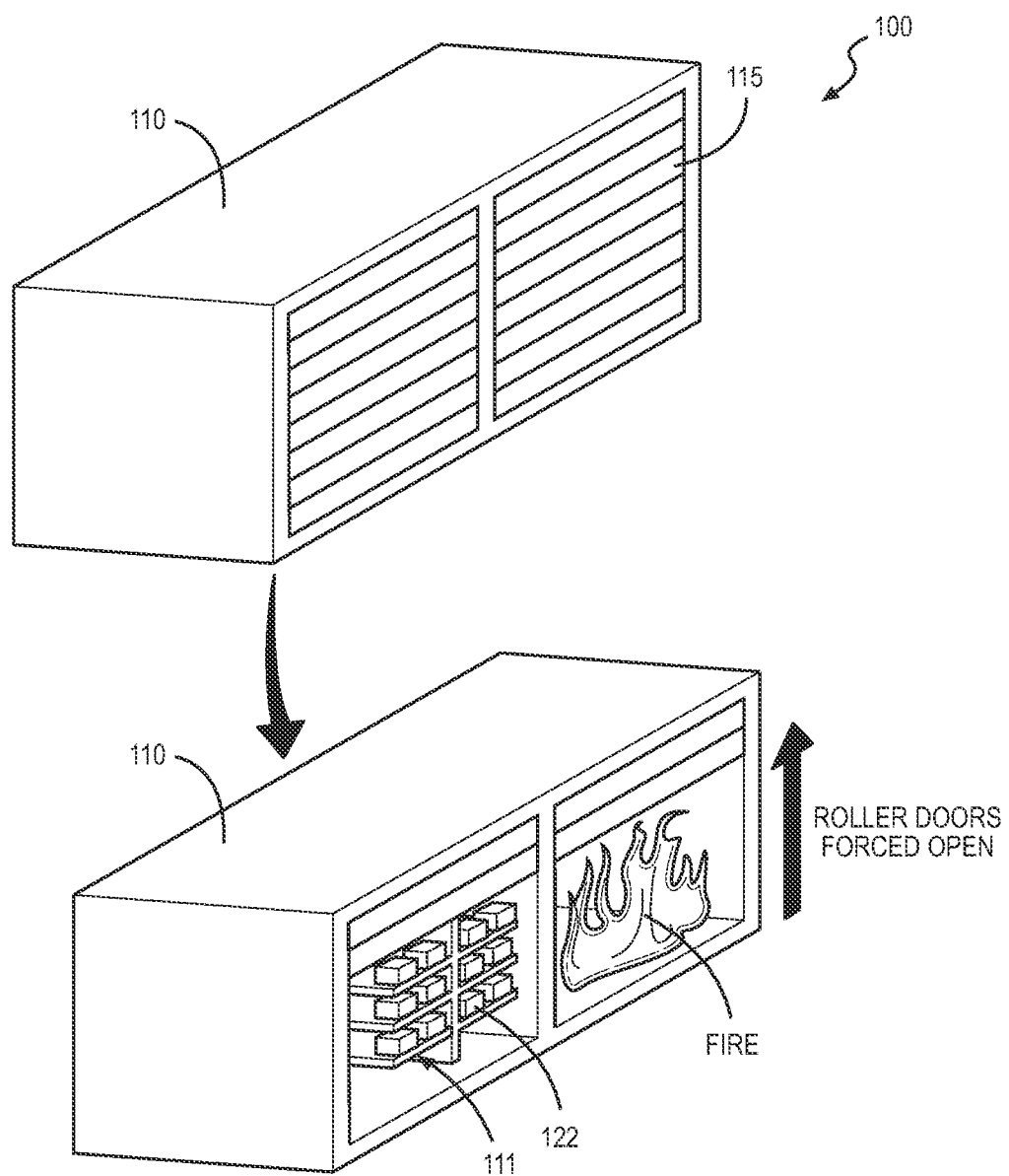
FIG. 2 is a flowchart representation of a method.
Figure 7:
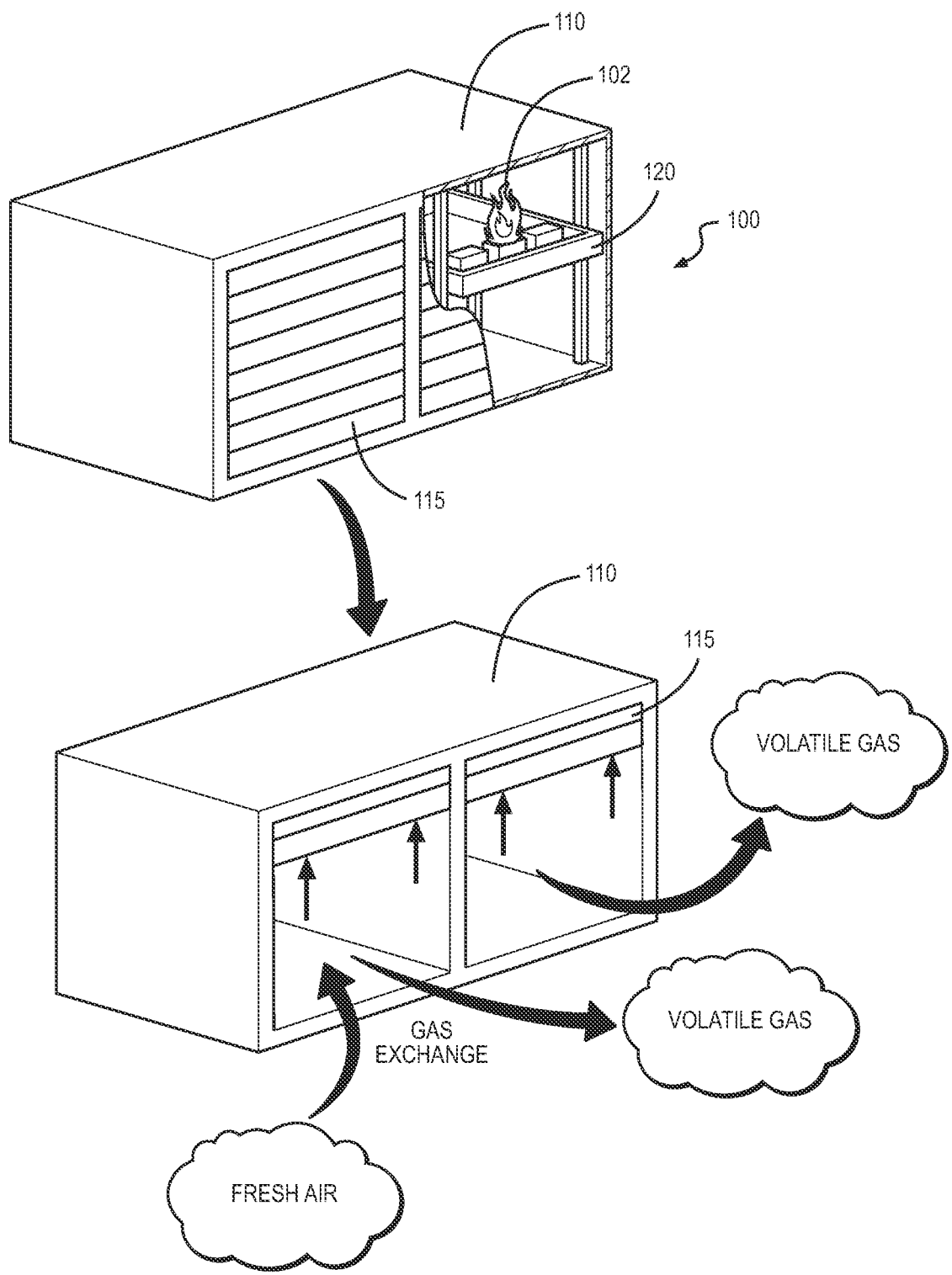
FIG. 7 is a flowchart representation of one variation of the method.

As shown in FIGS. 2 and 7, The system 100 can further include a door 115 arranged at the perimeter wall of the housing of the battery storage container 110 and can be configured to open when the controller 130 detects a change in ambient conditions within the storage chamber indicative of a potential explosive event such as the detection of hazardous gases (i.e., hydrogen, methane, hydrocarbons, carbon monoxide), such as described in U.S. patent application Ser. No. 17/843,212.

For example, the system 100 can include the sensor 113, configured to detect a precursor condition 102 to an incipient explosion event in the container, and the door 115 configured to transition from the closed position to the open position in response to the detection of the precursor condition 102 in the container. The door 115 transitioning to the open position exposes the interior of the container to the exterior environment, thereby venting any gases in the interior of the container to the exterior atmosphere.

Therefore, the system 100 can detect various precursor conditions 102 indicative of an incipient or imminent explosion event in the battery storage container 110 and initiate mitigation actions to slow or prevent progression to an explosion within the battery storage container 110. Generally, the system is configured to detect a precursor condition 102 and execute a mitigation action to suppress the precursor condition 102 before progression to an explosion event. Additionally, the system can be configured to execute mitigation actions in a sequence of increasing potency and/or destructiveness to increase the probability of preventing progression to the explosion event, while protecting a maximum number of elements of the system 100 not exhibiting a precursor condition 102 from secondary damage caused by the mitigation action.

14. INTEGRAL BATTERY RACK COOLING

Generally, as shown in FIGS. 9A and 9B, the system 100 can include a battery storage container 110 enclosing a battery rack 111 including a set of battery trays 120, each battery tray 120 configured to receive (and/or contain) a set of battery cells 122. The battery rack 111 can include a frame 170 supporting the battery rack 111 and the set of battery trays 120.

In one implementation, the frame 170 can include a set of (e.g., four, six) columns 172, each column 172 including a hollow body 186, such as a closed-end tube (e.g., rectangular tube, square tube, round tube). For example, the column 172 can include: a folded sheet metal element approximating a hollow rectangular tube; and metal plates arranged at opposing ends of the hollow rectangular tube. In this example, the column 172 can include joints (e.g., welds): at junctions between adjacent edges of the folded sheet metal element; and at junctions between the ends of the hollow rectangular tube and the metal plates to seal an interior volume of the column 172.

In another implementation, the frame 170 can further include a set of braces 176 (e.g., lateral braces, diagonal braces) connecting the set of columns 172. Accordingly, the frame 170 can define a free-standing structure for the battery rack 111.

In another implementation, a column 172 can include an inlet 180 coupled to a fluid supply 184, such as a supply manifold 157 or a fluid storage tank 184. In one example, the frame 170 can include the inlet 180 arranged on a first column 172 in the set of columns 172. In another example, the frame 170 can include the inlet 180 arranged on each column 172 in the set of columns 172.

In one implementation, a column 172 can further include a set of perforations 178 arranged along the column 172. More specifically, the column 172 can include the set of perforations 178 arranged on the column 172 facing an interior of the battery rack 111. For example, the column 172 can include the set of perforations 178 arranged along a section of the column 172 toward a center vertical axis of the battery rack 111. The column 172 can include a set of perforations 178 arranged on the column 172 between positions of each battery tray 120 in the battery rack 111. Additionally, the column 172 can include a set of perforations 178 arranged on the column 172 between a position of a top-most battery tray 120 in the battery rack 111 and a first end (e.g., a top end) of the column 172. In this implementation, each column 172 of the battery rack 111 defines a channel configured to circulate fluid from the inlet 180 to the perforations 178 and to expel toward the battery cells 122.

Accordingly, a battery rack 111 can integrally deliver fluid to battery cells 122 contained therein, such as in response to a battery cell 122 exhibiting a precursor condition 102, thereby integrating a plumbing system into a support structure for containing the battery cells 122. Therefore, the system 100 can simplify assembly and maximize space efficiency within the battery storage container 110 by minimizing a total footprint of fire mitigation elements therein.

14.1 Braces

In one variation, each brace 176 can include a hollow body 186—such as a closed-end tube (e.g., rectangular tube, square tube, round tube)—connecting a pair of columns 172 in the set of columns 172. Additionally, each brace 176 can include a set(s) of perforations 178 arranged on the brace 176 and facing the interior of the battery rack 111, such as arranged along a section of the brace 176 toward a center vertical axis of the battery rack 111. Additionally or alternatively, a brace 176 can include an inlet 180 coupled to a fluid supply 184.

14.1.1 Channel Network

In one example, the frame 170 can include: an inlet 180 fluidly coupled to a fluid supply 184; a first set of columns 172 including a first column 172 and a second column 172; and a first set of braces 176 including a first brace 176.

The frame 170 includes the first column 172 including: a first set of perforations 178 arranged on the first column and facing an interior of the battery rack 111; and a first hollow body 186 fluidly coupled to the inlet 180 and defining a first channel configured to circulate fluid from the inlet 180 to the first set of perforations 178.

The frame 170 also includes the second column 172 including: a second set of perforations 178 arranged on the second column 172 and facing the interior the battery rack 111; and a second hollow body 186 fluidly coupled to the first column and defining a second channel configured to circulate fluid from the first column 172 to the second set of perforations 178.

More specifically, the frame 170 includes the first brace 176 connecting the first column 172 to the second column 172, the first brace 176 including: a third set of perforations 178 arranged on the first brace 176 and facing the interior of the battery rack 111; and a third hollow body 186 fluidly coupling the first column 172 to the second column 172 and defining a third channel configured to circulate fluid from the first column 172 to the third set of perforations 178. Additionally, the first brace 176 defines the third channel configured to circulate fluid from the first column 172 (e.g., the first channel defined by the first hollow body 186) to the second column 172 (e.g., the second channel defined by the second hollow body 186).

Accordingly, each brace 176 of the battery rack 111 defines a channel through which fluid may flow from adjacent columns 172 to the perforations 178 and expel toward the battery cells 122, thereby increasing flow and coverage of fire suppression fluid onto a battery cell 122 exhibiting a precursor condition 102 within the battery rack 111.

In this variation, the battery rack 111 can include a set of braces 176 interconnected with a set of columns 172. More specifically, the frame 170 can define a network of channels via internal volumes of the set of braces 176 and the set of columns 172. In one example, the set of braces 176 and the set of columns 172 define a set of internal volumes connected in series to increase pressure at a singular perforation 178. In another example, the set of braces 176 and the set of columns 172 define a set of internal volumes connected in parallel to each other to increase uniformity of fluid discharge at a set of perforations 178. In another example, the set of braces 176 and the set of columns 172 define a set of internal volumes connected in a combination of series and parallel configurations.

In another variation, the frame can include a single inlet 180 through which fluid may flow from a fluid supply 184 to a network of channels defined by the set of braces 176 interconnected with the set of columns 172. In one example, the frame 170 includes an inlet 180 arranged on one column 172 in the set of columns 172. In another example, the frame 170 includes an inlet 180 arranged on one brace 176 in the set of braces 176.

14.1.2 Example Configurations

Generally, the battery rack 111 can be fluidly coupled to a fluid supply 184 via an inlet 180 arranged on a frame 170 of the battery rack 111.

In one example implementation, the battery rack 111 can be fluidly coupled to a pressurized fluid supply 184 (e.g., a fire hydrant, pressurized water tank) adjacent to the battery storage container 110. In this example implementation, the battery rack can include an inlet 180 arranged on a first column 172—in a set of columns 172—of the frame 170, the inlet 180 coupled to the pressurized water supply 184 via a hose (or a set of hoses). More specifically, the frame 170 can: define a network of channels via internal volumes of a set of braces 176 and the set of columns 172; receive pressurized fluid through the inlet 180; and contain the pressurized fluid in this network of channels.

In another example implementation, the battery rack can be fluidly coupled to another battery rack 111 within the battery storage container 110. In this example implementation, a first battery rack 111 can be connected to a pressurized fluid supply 184, such as described above, and a second battery rack 111 can be fluidly coupled to the first battery rack 111. The first battery rack 111 can include an outlet coupled (e.g., via a pipe) to an inlet 180 of the second battery rack, thereby enabling fluid to flow from the pressurized fluid supply to the second battery rack 111 via the first battery rack 111.

In another example implementation, a battery rack 111 can be fluidly coupled to a fluid supply 184 stored on a roof of the battery storage container. In this example implementation, the battery rack can include an inlet 180 arranged on a first brace 176—in a set of braces 176—of the frame 170, the inlet 180 coupled to the fluid supply 184 via a pipe (or a set of pipes). The frame 170 can similarly receive fluid through the inlet 180 and contain the fluid in a network of channels via internal volumes of the set of braces 176 and a set of columns 172.

14.2 Battery Tray Aperture

In one implementation, the battery tray 120 can include a set of walls extending from a base of the battery tray 120. In this implementation, a wall can include an aperture aligned with an adjacent perforation 178 arranged on a column 172 or a brace 176 of the frame 170, thereby enabling fluid to discharge from the perforation 178 on the column 172 or the brace 176—through the aperture—onto battery cells 122 stored on the battery tray 120. Accordingly, the system 100 can contain fluid discharged into a battery tray 120 via the set of walls, thereby reducing damage to battery cells 1222 stored on other battery trays 120 within the battery rack 111.

14.3 Perforation Cluster

In one implementation, the frame 170 can include a set of perforations 178 defining a perforation cluster arranged on a column 172 or brace 176. In this variation, the perforation cluster can include groups of perforations 178 exhibiting varying distributions and/or including perforations 178 characterized by varying sizes.

More specifically, each group of perforations 178 can exhibit a particular distribution (e.g., pattern, spacing) of perforations 178, each perforation 178—in the group of perforations 178—characterized by a particular size. Accordingly, each group of perforations 178 is configured to generate (and expel fluid): a particular spray pattern; a particular spray angle; a particular volumetric flow rate; and/or a particular drop size distribution.

In one example, a perforation cluster includes a first group of perforations 178—exhibiting a first distribution and/or a first perforation size—configured to expel fluid in a directed stream pattern effective in rapidly cooling a targeted area.

In another example, the perforation cluster includes a second group of perforations 178—exhibiting a second distribution and/or a second perforation size-configured to expel fluid in a sheet pattern effective in cooling a wider area than a directed stream pattern.

In another example, the perforation cluster includes a third group of perforations 178—exhibiting a third distribution and/or a third perforation size-configured to expel fluid in a mist pattern effective in suspending coolant around objects in a volume (e.g., around the battery cells 122 within an interior of the battery rack 111).

Accordingly, by implementing these different groups of perforations 178 in close proximity within a perforation cluster, the system 100 can generate a combination of spray patterns toward the battery cells 122, thereby achieving a broad coverage of fluid within the battery rack 111 and/or the battery storage container 110.

14.4 Nozzles

In another implementation, the frame 170 can include a set of nozzles 188 arranged on the set of columns 172 and/or the set of braces 176 and facing an interior of the battery rack 111, such as along a section of a column 172 (or a section of a brace 176) toward a center vertical axis of the battery rack 111.

For example, the battery rack 111 can include a first nozzle 188 removably attached to a first column 172. In this example, the first column 172 includes an aperture defining threads into which the first nozzle 188 connects (e.g., via matching threads defined on the nozzle) to the first column 172. The first nozzle 188 can then: receive fluid from the first column 172; and expel the fluid toward the battery cells 122.

In another implementation, a nozzle 188 can include a perforation cluster-arranged at an outlet of the nozzle 188—configured to generate a combination of spray patterns as described above, thereby achieving a broad coverage of fluid within the battery rack 111 and/or the battery storage container 110.

For example, the battery rack 111 can include a first nozzle 188 removably attached to the first column 172. The first nozzle 188 can include a first set of perforations 178 including: a first group of perforations 178—exhibiting a first distribution and/or a first perforation size—configured to expel fluid in a directed stream pattern effective in rapidly cooling a targeted area; a second group of perforations 178, exhibiting a second distribution and/or a second perforation size, configured to expel fluid in a sheet pattern effective in cooling a wider area than a directed stream pattern; and/or a third group of perforations 178, exhibiting a third distribution and/or a third perforation size, configured to expel fluid in a mist pattern effective in suspending coolant around objects in a volume (e.g., around the battery cells 122 within an interior of the battery rack 111). In this example, the first column 172—fluidly coupled to an inlet 180—defines a first channel from the inlet 180 to the first perforation cluster of the first nozzle 188.

15. PASSIVE SENSING & ACTIVATION

In one implementation, the frame 170 can include a set of meltable plugs 153, each meltable plug 153 arranged over a perforation 178 (and/or each nozzle). Each meltable plug 153 is configured: to seal a perforation 178 in response to an ambient temperature proximal the perforation 178 falling below a predefined temperature threshold; and melt in response to the ambient temperature proximal the perforation 178 exceeding the predefined temperature threshold, thereby releasing fluid onto the battery cells 122, as described above. For example, the meltable plug 153 can be composed of a thermoplastic material that has a melting temperature at or near a minimum temperature of an active fire (e.g., 200 degrees Celsius).

Accordingly, a battery rack 111 can: contain a volume of fire suppression fluid within the frame 170 (e.g., within columns 172, within braces 176); and discharge the fluid in a spray pattern toward the set of battery cells 122 in response to a specific change in ambient temperature indicative of an active fire, thereby interrupting spread of the fire across a set of battery racks 111 within a battery storage container 110 and/or across a population of battery storage containers 110 within an entire facility.

Furthermore, by implementing meltable plugs 153 that release fluid in response to an ambient temperature exceeding the threshold (i.e., indicative of an active fire), the system 100 can localize this fluid release onto battery cells 122 affected by the precursor condition while minimizing release of fluid onto unaffected battery cells 122.

In one variation, the frame 170 can include a set of pressure-sensitive plugs 154, each pressure-sensitive plug 154 arranged over a perforation 178 (and/or each nozzle). Each pressure-sensitive plug 154 is configured: to seal a perforation 178 in response to a fluid pressure proximal the pressure-sensitive plug 154—such as within a channel defined by the hollow body of a column 172 or a brace 176—falling below a predefined pressure threshold; and eject from the perforation 178 in response to the fluid pressure within the channel exceeding the predefined pressure threshold, thereby releasing fluid onto the battery cells 122, as described above.

15.1 Bimetallic Element

In another implementation, as shown in FIGS. 10A and 10B, the system 100 can include: a valve 182 interposed between the fluid supply 184 and the inlet 180 of the battery rack 111; a circuit 196 configured to control a state (e.g., an open state, a closed state) of the valve 182; and a bimetallic element 194 selectively coupled to the circuit 196 based on a predefined temperature threshold. More specifically, the circuit 196 is configured to trigger the valve 182 to transition from a closed state to an open state in response to an ambient temperature proximal the battery rack exceeding the predefined temperature threshold, thereby releasing fluid from the fluid supply 184 into the inlet 180 of the battery rack 111.

In one example, the bimetallic element 194 (e.g., a bimetallic strip) is decoupled from the circuit 196 in response to an ambient temperature proximal the battery rack 111 exceeding the predefined temperature threshold. In this example, the bimetallic element 194: couples to the circuit 196 in response to the ambient temperature proximal the battery rack 111 exceeding the predefined temperature threshold; and, in response to the bimetallic element 194 coupling to the circuit 196, the circuit 196 triggers the valve 182 to transition from the closed state to the open state.

In another example, the bimetallic element 192 is coupled to the circuit 196 in response to an ambient temperature proximal the battery rack 111 exceeding the predefined temperature threshold. In this example, the bimetallic element 194 decouples from the circuit 196 in response to the ambient temperature proximal the battery rack 111 exceeding the predefined temperature threshold; and, in response to the bimetallic element 194 decoupling from the circuit 196, the circuit 196 triggers the valve 182 to transition from the closed state to the open state.

16. ACTIVE SENSING & ACTIVATION

Additionally or alternatively, the system 100 can include: a controller 130; a sensor 113 (e.g., an infrared sensor, a thermal imaging sensor, a temperature sensor, a humidity sensor, a light sensor, a pressure sensor, a gas concentration sensor) configured to detect a precursor condition indicative of a possible fire within the battery storage container 110; and/or a valve 182 (e.g., an electro-mechanical valve), interposed between a fluid storage tank 184 (or other fluid reservoir) and the inlet 180, configured to open (e.g., in response to the sensor 113 detecting the precursor condition) and release fire suppression fluid to flow from a fluid storage tank 184 (or other fluid reservoir) to the inlet 180 of the battery rack 111, through the columns 172 (and/or the braces 176) and the perforations 178, to direct flow of fire suppression fluid toward the set of battery cells 122 within the battery storage container 110.

16.1 Sensors

Block S170 of the method S100 recites generating a first signal representing ambient condition proximal the first battery rack during a first time period.

Generally, the system 100 can include a sensor 113 configured to generate a signal representing ambient condition(s) proximal the battery rack 111.

In one implementation, the system 100 can include a sensor 113 configured to: detect a precursor condition within the battery storage container 110; and transmit a signal to the controller 130 in response to detecting the precursor condition.

In one example, the sensor 113 can include a temperature sensor configured to detect an ambient temperature exceeding a threshold temperature (e.g., 200 degrees Celsius). In this example, in response to detecting the ambient temperature exceeding the threshold, the sensor can transmit a signal to the controller representing a precursor condition. Additionally, the temperature sensor can periodically transmit a signal-representing an ambient temperature (e.g., proximal the battery rack 111) detected by the temperature sensor—to the controller 130.

In another example, the sensor 113 can include a light sensor configured to detect an ambient illuminance exceeding a threshold illuminance. In this example, in response to detecting the ambient temperature exceeding the threshold, the sensor can transmit a signal to the controller representing a precursor condition. Additionally, the light sensor can periodically transmit a signal—representing an ambient illuminance detected by the sensor—to the controller 130.

In one implementation, the system 100 can include the sensor 113 arranged external to a battery rack 111, such as arranged on a ceiling of the battery storage container 110 and configured to detect ambient conditions within the battery storage container 110. For example, the system 100 can include a set of sensors 113 arranged within the battery storage container 110 to generate an overlapping field of view and/or a redundancy to detect a precursor condition within the battery storage container 110.

Additionally or alternatively, the system 100 can include the sensor 113 (or a set of sensors) arranged on the battery rack 111 and/or on the battery tray 120.

16.2 Controller

Blocks of the method S100 recite: in response to receiving the first signal from the first sensor, detecting a first precursor condition to a fire event based on the first signal in Block S172; and, in response to detecting the first precursor condition, triggering a first valve to transition from a closed state to an open state in Block S174.

In one implementation, the system 100 can include a controller 130 configured to: receive a signal—representing ambient condition proximal the battery rack 111—from the sensor 113; detect a first precursor condition to a fire event based on the signal in Block S172; and, in response to detecting the first precursor condition, trigger the valve 182 to transition from a closed state to an open state in Block S174.

For example, the system 100 can include: a first temperature sensor 113 arranged on the battery rack 111; and the controller 130. In this example, as shown in FIG. 11, the first temperature sensor 113: generates a first signal representing a first ambient temperature proximal the first battery rack 111 during a target time period in Block S170; and transmits the first signal to the controller 130. The controller 130: receives the first signal from the first temperature sensor 113; detects a first precursor condition to a fire event in response to the first ambient temperature exceeding a predefined temperature threshold in Block S172; and, in response to detecting the first precursor condition, triggers the valve 184 to transition from a closed state to an open state in Block S174.

In one variation, the system 100 can include a controller communicatively coupled to the sensor 113 and the valve 182. More specifically, the controller 130 can: receive a signal—representing a precursor condition—from the sensor 130; and, in response to receiving the signal, trigger the valve 182 to transition from a closed state to an open state.

16.3 Precursor Condition Detection Based on Combinations of Sensor Signals

In one implementation, the controller 130 can detect a precursor condition to a fire event based on a combination of signals generated by a sensor 113 (or a set of sensors 113), such as described in U.S. patent application Ser. No. 15/374,781.

More specifically, the system 100 can compare outputs of a sensor(s) 113 over multiple time intervals (e.g., an interval of several minutes) to identify changes in an ambient condition(s) measured by the sensor. Then, based on a magnitude, rate, and/or frequency of a change in one or more ambient conditions, the system 100 can detect and/or confirm a fire event. The system 100 can therefore track changes in one or more ambient conditions—rather than or in addition to absolute ambient condition values—to detect, confirm, and/or classify a fire event over time.

16.3.1 Light Intensity+Humidity

Generally, as a fire ignites and then develops within a space, the fire may emit electromagnetic radiation (e.g., infrared light) that is first registered—at a first time—by the light sensor as an increase in light intensity over a recent steady-state incident light intensity. Based on variations in the intensity of this electromagnetic radiation following the detected increase, the system 100 can confirm that the increased light intensity corresponds to a flame or fire. With water as a product of combustion, the relative humidity within the space (e.g., a closed, confined space) may initially increase; as moisture from the flame moves within the space and reaches the system 100 at a second time, the humidity sensor can register this increase in humidity over a recent steady-state humidity, and the system 100 can apply this detected humidity increase to the previously-detected increase in ambient light intensity to confirm presence of a fire within the space. Therefore, in one implementation, the system 100 can detect and confirm a fire event by first detecting an increase in ambient light intensity followed by an increase in ambient humidity.

In one example, the system 100 includes: a light sensor 113 configured to generate signals representing ambient light intensity proximal a first battery rack 111; a humidity sensor 113 configured to generate signals representing ambient humidity proximal the first battery rack 111; and a controller 130 configured to detect a precursor condition to a fire event based on these signals.

Figure 12:
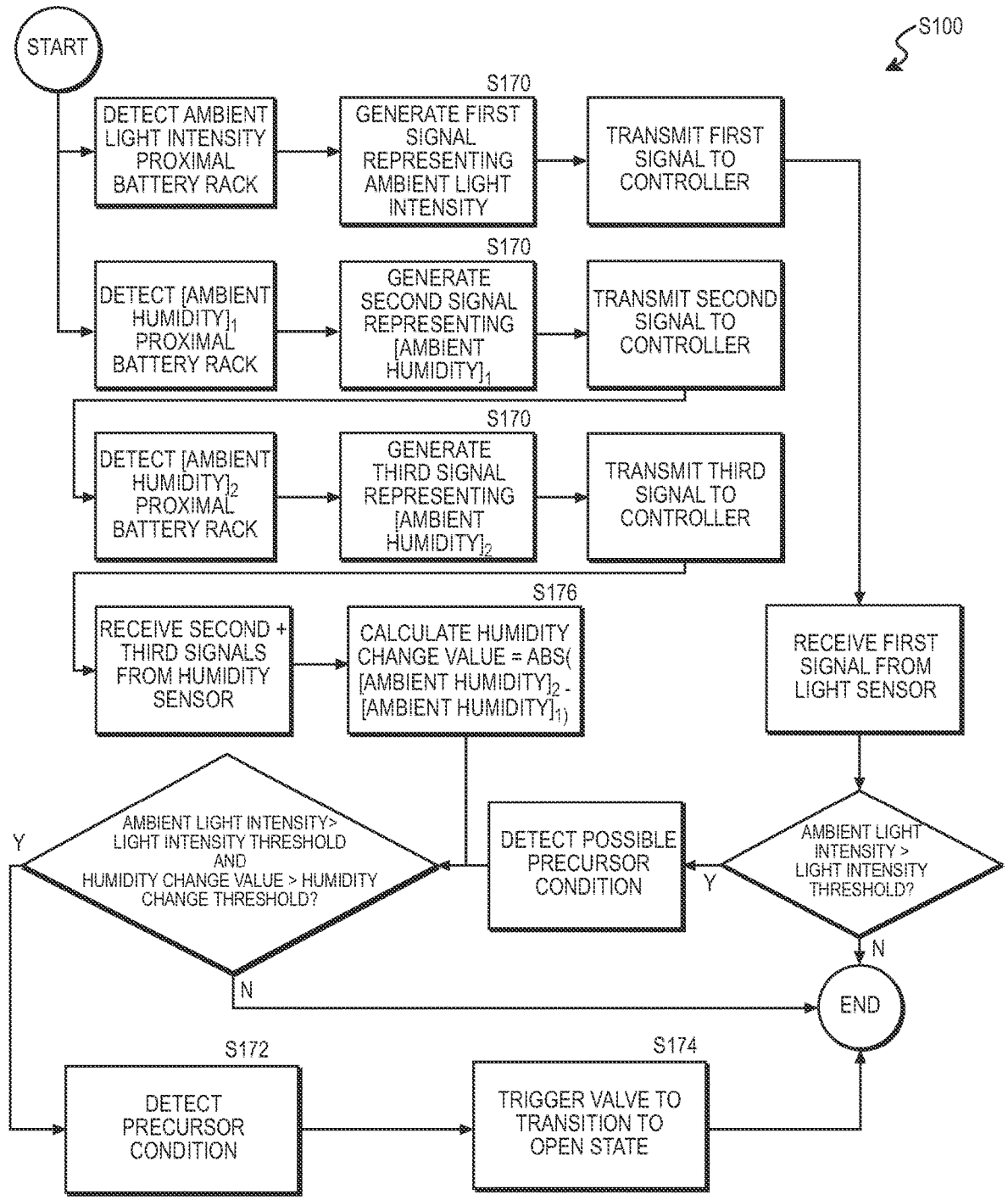
FIG. 12 is a flowchart representation of one variation of the method.

More specifically, as shown in FIG. 12, the light sensor 113: generates a first signal representing a first ambient light intensity proximal the first battery rack 111 during a first time period in Block S170; and transmits the first signal to the controller 130. The controller 130: receives the first signal from the light sensor 113; and, in response to the first ambient light intensity exceeding a predefined light intensity threshold, detects a possible precursor condition to a fire event.

In this example, the humidity sensor 113: generates a second signal representing a first ambient humidity proximal the first battery rack 111 during the first time period in Block S170; and generates a third signal representing a second ambient humidity proximal the first battery rack 111 during a second time period succeeding the first time period in Block S170.

In response to receiving the second signal and the third signal from the humidity sensor 113, the controller 130 calculates a first humidity change value based on a difference between the second ambient humidity and the first ambient humidity in Block S176. In Block 172, the controller 130 detects a precursor condition to a fire event in response to: the first ambient light intensity exceeding the predefined light intensity threshold; and the first humidity change value exceeding a predefined humidity change threshold.

Accordingly, the controller 130 can confirm a precursor condition to the fire event based on a combination of signals representing ambient light intensity and ambient humidity proximal the first battery rack 111.

16.3.2 Light Intensity+Gas Concentration

In another example, the system 100 can detect and confirm a fire event based on an increase in ambient light intensity followed by a decrease in ambient light intensity. In particular, the onset of a fire may be accompanied by a significant increase in ambient light intensity, which the system 100 can detect via its integrated light sensor. As the fire burns and produces smoke, this smoke may obscure light produced by the fire from reaching the light sensor, thereby yielding a decrease in ambient light intensity detected by the system 100 as the fire burns. The system 100 can therefore associate a decrease in detected light intensity—following an increase in detected light intensity and issuance of a fire event flag—with an increasing presence of smoke (e.g., a high density of smoke near the system 100).

In this example, the system 100 includes: a light sensor 113 configured to generate signals representing ambient light intensity proximal the first battery rack 111; a gas sensor 113 configured to generate signals representing gas (e.g., carbon monoxide, carbon dioxide, volatile organic compounds, benzene, sulfur hexafluoride, hydrogen) concentration in ambient air proximal the first battery rack 111; and a controller 130 configured to detect a precursor condition to a fire event based on these signals.

Figure 13:
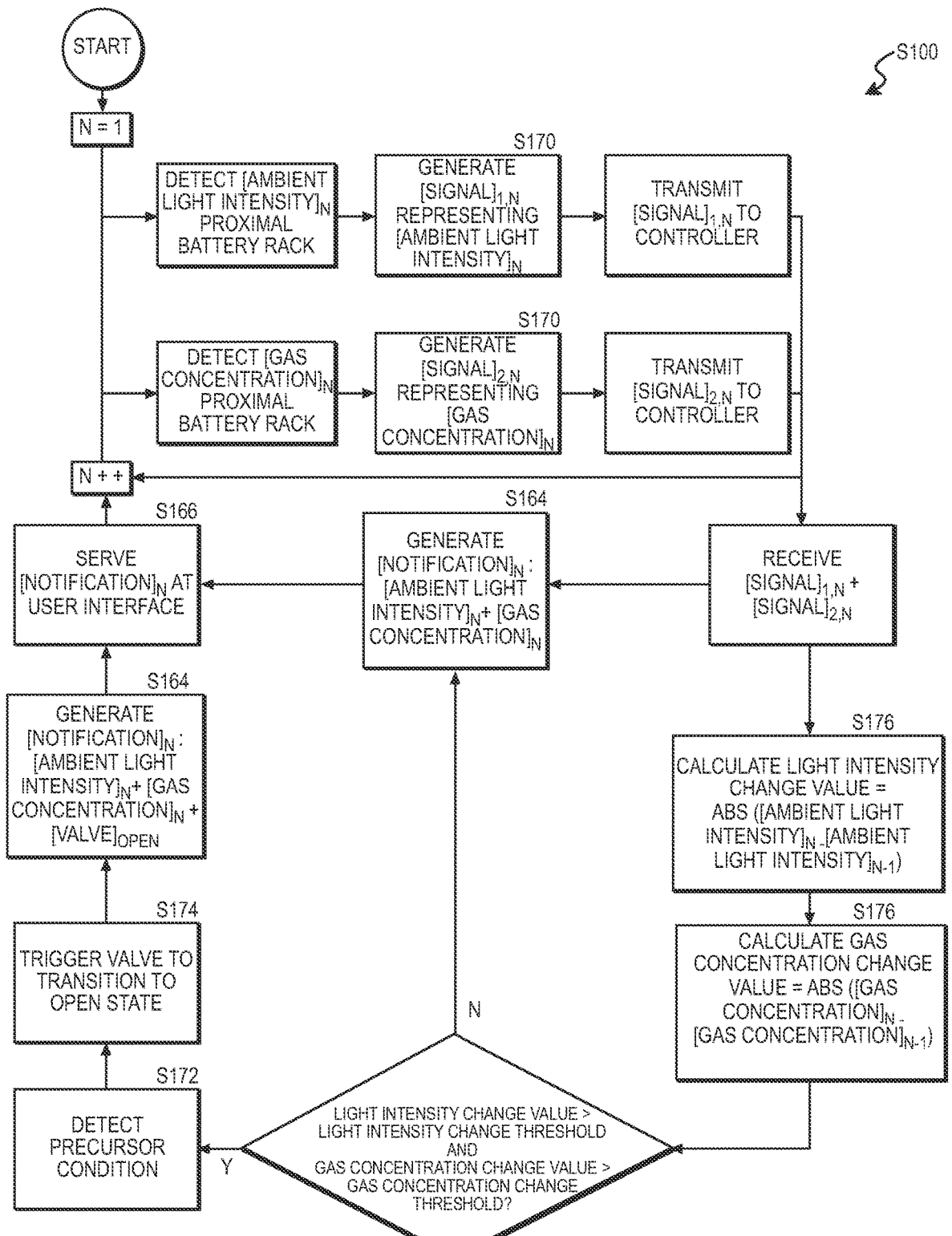
FIG. 13 is a flowchart representation of one variation of the method.

More specifically, as shown in FIG. 13, the light sensor 113: generates a first signal representing a first ambient light intensity proximal the first battery rack 111 during a first time period in Block S170; transmits the first signal to the controller 130; generates a second signal representing a second ambient light intensity proximal the first battery rack 111 during a second time period succeeding the first time period in Block S170; and transmits the second signal to the controller 130.

Additionally, the gas sensor 113: generates a third signal representing a first gas concentration in ambient air proximal the first battery rack 111 during the first time period in Block S170; transmits the third signal to the controller 130; generates a fourth signal representing a second gas concentration in ambient air proximal the first battery rack 111 during the second time period in Block S170; and transmits the fourth signal to the controller 130.

In response to receiving the first signal, the second signal, the third signal, and the fourth signal from the light sensor 113 and the gas sensor 113, the controller 130: calculates a first ambient light intensity change value based on a difference between the second ambient light intensity and the first ambient light intensity in Block S176; and calculates a first gas concentration change value based on a difference between the second gas concentration and the first gas concentration in Block S176. In Block S172, the controller 130 detects a precursor condition to a fire event in response to: the first ambient light intensity change value exceeding the predefined light intensity change threshold; and the first gas concentration change value exceeding a predefined gas concentration change threshold.

Accordingly, the system 100 can detect the precursor condition based on a decrease in detected ambient light intensity—and an increase in detected gas concentration—between the first time period and the second time period, such as in response to smoke production due to fire. Therefore, the system 100 can confirm the precursor condition based on a combination of signals generated by a combination of sensors, thereby reducing "false positive" errors that lead to unnecessary damage to battery cells 122 within the battery storage container 110.

16.3.3 Temperature+Humidity

In another example, the system 100 includes: a temperature sensor 113 configured to generate signals representing ambient temperature proximal the first battery rack 111; a humidity sensor 113 configured to generate signals representing ambient humidity proximal the first battery rack 111; and a controller 130 configured to detect a precursor condition to a fire event based on these signals.

Figure 14:
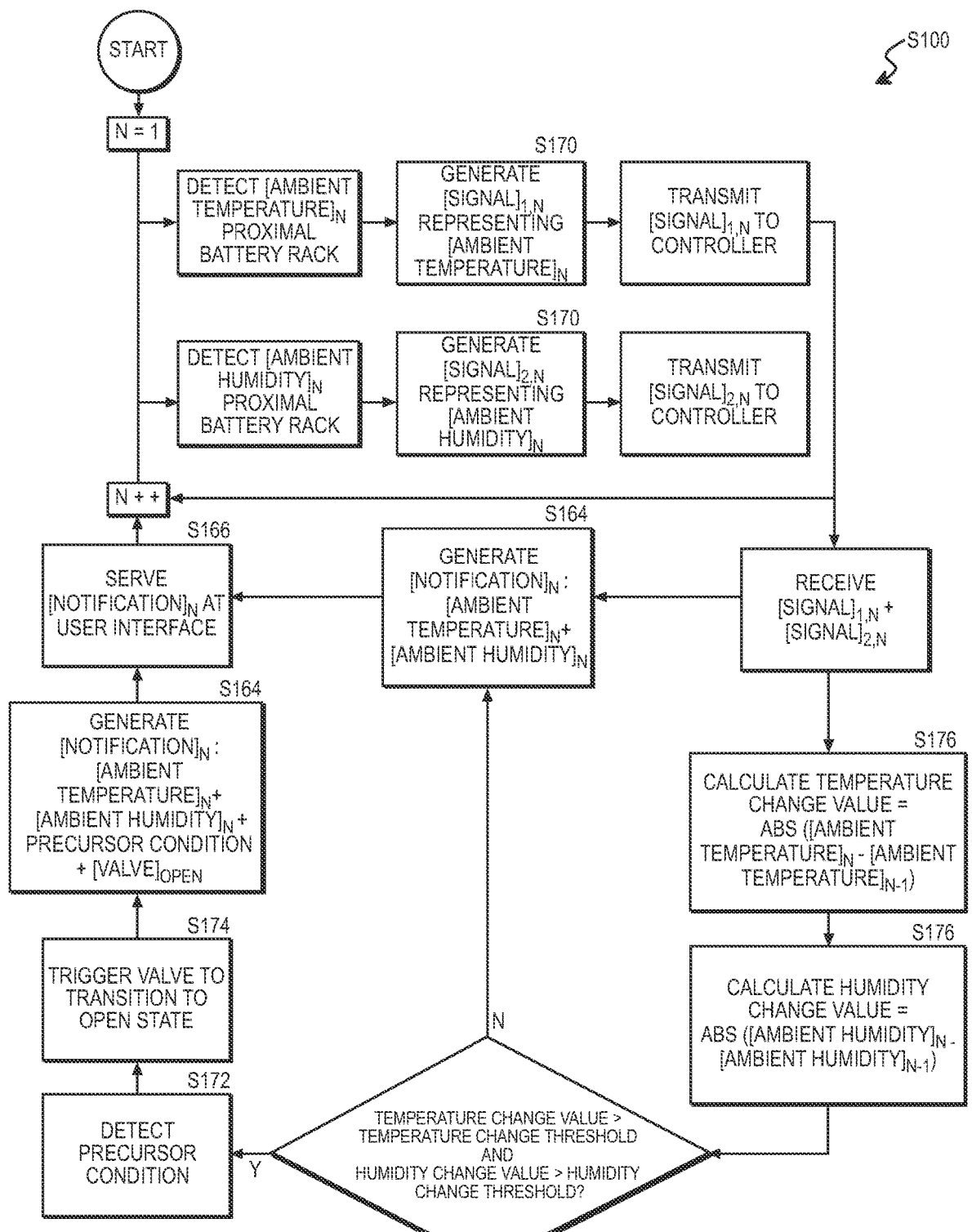
FIG. 14 is a flowchart representation of one variation of the method.

More specifically, as shown in FIG. 14, the temperature sensor 113: generates a first signal representing a first ambient temperature proximal the first battery rack 111 during a first time period in Block S170; transmits the first signal to the controller 130; generates a second signal representing a second temperature intensity proximal the first battery rack 111 during a second time period succeeding the first time period in Block S170; and transmits the second signal to the controller 130.

Additionally, the humidity sensor 113: generates a third signal representing a first ambient humidity proximal the first battery rack 111 during the first time period in Block S170; transmits the third signal to the controller 130; generates a fourth signal representing a second ambient humidity proximal the first battery rack 111 during the second time period in Block S170; and transmits the fourth signal to the controller 130.

In response to receiving the first signal, the second signal, the third signal, and the fourth signal from the temperature sensor 113 and the humidity sensor 113, the controller 130: calculates a first temperature intensity change value based on a difference between the second ambient temperature and the first ambient temperature in Block S176; and calculates a first humidity change value based on a difference between the second ambient humidity and the first ambient humidity in Block S176. In Block S172, the controller 130 detects a precursor condition to a fire event in response to: the first temperature change value exceeding the predefined temperature change threshold; and the first humidity change value exceeding a predefined humidity change threshold.

16.3.4 Sensors Arranged on Multiple Battery Racks

In another example, the system 100 includes: a first battery rack 111 fluidly coupled to a fluid supply 184 via a first inlet 180 of the first battery rack 111; a second battery rack 111 fluidly coupled to the first battery rack 111 via a second inlet 180 of the second battery rack 111; a first valve 182 interposed between the fluid supply 184 and the first inlet 180; and a controller 130 configured to trigger the first valve 182 to transition from a closed state to an open state in response to detecting a precursor condition to a first event.

The first battery rack 111 also includes a first sensor(s) 113 arranged on the first battery rack 111 configured to: generate a first signal representing ambient condition(s) (e.g., temperature, humidity, gas concentration, light intensity) proximal the first battery rack 111; and transmit the first signal to the controller 130, as described above. Similarly, the second battery rack 111 also includes a second sensor(s) 113 arranged on the second battery rack 111 and configured to: generate a second signal representing ambient condition(s) proximal the second battery rack 111; and transmit the second signal to the controller 130.

In this example, the controller 130 can execute similar methods and techniques described above: to receive the second signal from the second sensor 113; to detect a second precursor condition to the fire event based on the second signal; and, in response to detecting the second precursor condition, to trigger the first valve to transition from the closed state to the open state.

Accordingly, the controller 130 can redundantly detect a precursor condition to a fire event based on signals received from multiple sensors arranged on multiple battery racks, thereby increasing fault-tolerance of the system 100.

16.4 Integration with Overhead Fire Suppression

Generally, the system 100 can include (or integrate with) an overhead fire suppression system within a battery storage container 110.

In one implementation, the system 100 includes: a first battery rack 111 fluidly coupled to a fluid supply 184 via a first inlet 180 of the first battery rack 111; a second battery rack 111 fluidly coupled to the first battery rack 111 via a second inlet 180 of the second battery rack 111; a first valve 182 interposed between the fluid supply 184 and the first inlet 180; and a controller 130 configured to trigger the first valve 182 to transition from a closed state to an open state in response to detecting a precursor condition to a first event.

The first battery rack 111 also includes a first sensor(s) 111 arranged on the first battery rack 111 configured to: generate a first signal representing ambient condition(s) (e.g., temperature, humidity, gas concentration, light intensity) proximal the first battery rack 111; and transmit the first signal to the controller 130, as described above. Similarly, the second battery rack 111 also includes a second sensor(s) 113 arranged on the second battery rack 111 and configured to: generate a second signal representing ambient condition(s) proximal the second battery rack 111; and transmit the second signal to the controller 130.

The system 100 can also include: a nozzle 192—fluidly coupled to the fluid supply 184 (or a separate fluid supply)—arranged above the first battery rack 111 and the second battery rack 111; and a second valve 190 interposed between the second nozzle 192 and the fluid supply 184.

In this implementation, the controller 130 can execute the foregoing methods and techniques: to receive the first signal from the first sensor 113; to detect a first precursor condition to the fire event based on the first signal; to receive the second signal from the second sensor 113; and to detect a second precursor condition to the fire event based on the second signal. The controller 130 can then trigger the second valve to open in response to detecting the first precursor condition and the second precursor condition.

17. NOTIFICATION

Additionally, in response to detecting a precursor condition to a fire event, the controller 130 can: generate a notification indicating the precursor condition and/or the valve characterized by the open state in Block S164; and serve the notification at a user interface in Block S166.

In another implementation, the controller can: periodically receive a signal from the sensor 113 representing current ambient condition(s) within the battery storage container 110, the battery rack 111, and/or the battery tray 120; generate a notification based on the signal in Block S164; and serve the notification at a user interface in Block S168.

In one example, the controller 130 can periodically receive a signal—from a temperature sensor—representing a current ambient temperature within the battery storage container 110. In response to receiving the signal from the sensor, the controller can: generate a notification specifying the current ambient temperature in Block S164; and serve the notification at the user interface in Block S166.

In another example, the system 100 includes: a temperature sensor 113 configured to generate signals representing ambient temperature proximal the first battery rack 111; a humidity sensor 113 configured to generate signals representing ambient humidity proximal the first battery rack 111; and a controller 130 configured to detect a precursor condition to a fire event based on these signals.

During a first time period, the temperature sensor 113: generates a first signal representing a first ambient temperature proximal the first battery rack 111 during the first time period in Block S170; and transmits the first signal to the controller 130. The humidity sensor 113: generates a third signal representing a first ambient humidity proximal the first battery rack 111 during the first time period in Block S170; and transmits the third signal to the controller 130.

In response to receiving the first signal and the second signal, the controller 130: generates a first notification specifying the first ambient temperature and the first ambient humidity in Block S164; and serves the first notification to a user interface in Block S166.

During a second time period succeeding the first time period, the temperature sensor 113: generates a second signal representing a second ambient temperature proximal the first battery rack 111 during the second time period in Block S170; and transmits the second signal to the controller 130. The humidity sensor 113: generates a fourth signal representing a second ambient humidity proximal the first battery rack 111 during the second time period in Block S170; and transmits the fourth signal to the controller 130.

In response to receiving the third signal and the fourth signal, the controller 130: generates a second notification specifying the second ambient temperature and the second ambient humidity in Block S164; and serves the second notification to the user interface in Block S166.

Therefore, the system 100 can notify an operator—in real-time (or near real-time)—of presence of a precursor condition(s) to a fire event and/or current ambient conditions proximal a battery rack(s) associated with the precursor condition and/or the fire event.

17.1 Location Information

Generally, the system 100 can: identify a location of a sensor 113 within the battery container 110 (and/or within an energy storage facility); generate a signal representing ambient conditions proximal the sensor 113; detect a precursor condition to a fire event based on the signal; associate the fire event with the location of the sensor 113; and generate a notification indicating the fire event at the location of the sensor 113.

In one implementation, the system 100 can include: a first battery storage container 110 including a set of battery racks 111, each battery rack 111 including a sensor 113 arranged on the battery rack 111; and a controller 130. For example, the set of battery racks 111 can include: a first battery rack 111 including a first sensor 113 arranged on the first battery rack 111; and a second battery rack 111 including a second sensor 113 arranged on the second battery rack 111.

In this implementation, the controller 130 can: access first location information specifying a first location of the first sensor 113 (or a first location of the first battery rack 111 on which the first sensor 113 is arranged) within the first battery storage container 110; and access second location information specifying a second location of the second sensor 113 (or a second location of the second battery rack 111 on which the second sensor 113 is arranged) within the first battery storage container 110.

In another implementation, the controller 130 can execute the foregoing methods and techniques: to receive a first signal from the first sensor 113 representing ambient condition proximal the first battery rack 111; and to detect a first precursor condition to a fire event based on the first signal in Block S172.

Additionally, in response to detecting the first precursor condition, the controller 1130 can: associate the fire event with the first location of the first battery rack 111 within the energy storage facility in Block S180; generate a notification indicating the fire event at the first location S164; and serve the notification to a user interface in Block S166.

For example, the system 100 can execute similar methods and techniques described in U.S. patent application Ser. No. 15/374,781: to access a digital floor plan of an energy storage facility; to associate a first sensor 113 to a first battery storage container 110 within the energy storage facility; to access a first fire event for the first battery storage container 110 and a first ambient temperature in the first battery storage container 110 from the first sensor 113; to populate a first virtual map with visual representations of the first fire event, and the first ambient temperature; and to transmit the first virtual map to a responder portal.

18. CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A system comprising:
   a first battery rack comprising:
      a first battery tray configured to receive a first set of battery cells;
      a first frame configured to support the first battery tray, the first frame comprising:
         a first inlet fluidly coupled to a fluid supply;
         a first column comprising:
            a first set of perforations arranged on the first column and facing an interior of the first battery rack; and
            a first hollow body fluidly coupled to the first inlet and defining a first channel configured to circulate fluid from the first inlet to the first set of perforations; and
         a second column comprising:
            a second set of perforations arranged on the second column and facing the interior the first battery rack; and
            a second hollow body fluidly coupled to the first column and defining a second channel configured to circulate fluid from the first column to the second set of perforations; and
      a first valve interposed between the fluid supply and the first inlet;
      a first sensor configured to generate a first signal representing ambient condition proximal the first battery rack; and
   a first controller configured to:
      receive the first signal from the first sensor;
      detect a first precursor condition to a fire event based on the first signal; and
      in response to detecting the first precursor condition, trigger the first valve to transition from a closed state to an open state.

2. The system of claim 1, wherein the first frame further comprises:
   a first brace connecting the first column to the second column, the first brace comprising:
      a third set of perforations arranged on the first brace and facing the interior of the first battery rack; and
      a third hollow body fluidly coupling the first column to the second column and defining a third channel configured to circulate fluid from the first column to the third set of perforations.

3. The system of claim 1:
   further comprising:
      a second battery rack comprising:
         a second battery tray configured to receive a second set of battery cells; and
         a second frame configured to support the second battery tray, the second frame comprising:
            a second inlet fluidly coupled to the first battery rack; and
            a set of columns, each column, in the set of columns, comprising:
               a set of perforations arranged on the column and facing an interior of the second battery rack; and
               a hollow body fluidly coupled to the second inlet and defining a channel configured to circulate fluid from the second inlet to the set of perforations; and
      a second sensor configured to generate a second signal representing ambient condition proximal the second battery rack; and
   wherein the first controller is configured to:
      receive the second signal from the second sensor;
      detect a second precursor condition to the fire event based on the second signal; and
      in response to detecting the second precursor condition, trigger the first valve to transition from the closed state to the open state.

4. The system of claim 3:
   further comprising:
      a first nozzle, fluidly coupled to the fluid supply, arranged above the first battery rack and the second battery rack; and
      a second valve interposed between the first nozzle and the fluid supply; and
   wherein the first controller is configured to trigger the second valve to open in response to detecting the first precursor condition and the second precursor condition.

5. The system of claim 1, further comprising:
   a first set of meltable plugs arranged over the first set of perforations, each meltable plug, in the first set of meltable plugs, configured to:
      seal a perforation, in the first set of perforations, in response to an ambient temperature proximal the perforation falling below a predefined temperature threshold; and
      melt in response to the ambient temperature proximal the perforation exceeding the predefined temperature threshold.

6. The system of claim 1, further comprising:
a first set of pressure-sensitive plugs arranged over the first set of perforations, each pressure-sensitive plug, in the first set of pressure-sensitive plugs, configured to:
seal a perforation, in the first set of perforations, in response to a fluid pressure within the first channel falling below a predefined pressure threshold; and
eject from the perforation in response to the fluid pressure within the first channel exceeding the predefined pressure threshold.

7. The system of claim 1, wherein the first set of perforations comprises:
a first group of perforations, exhibiting a first distribution and a first perforation size, configured to expel fluid in a directed stream pattern; and
a second group of perforations, exhibiting a second distribution and a second perforation size configured to expel fluid in a mist stream pattern.

8. The system of claim 1:
wherein the first battery rack further comprises a first nozzle removably attached to the first column, the first nozzle comprising a first perforation cluster arranged at an outlet of the first nozzle and configured to generate a combination of spray patterns; and
wherein the first channel is configured to circulate fluid from the first inlet to the first perforation cluster.

9. The system of claim 1:
wherein the first sensor comprises a first temperature sensor arranged on the first battery rack, the first temperature sensor configured to generate the first signal representing a first ambient temperature proximal the first battery rack; and
wherein the first controller comprises the first controller configured to detect the first precursor condition in response to the first ambient temperature exceeding a predefined temperature threshold.

10. The system of claim 9:
wherein the first temperature sensor comprises the first temperature sensor configured to:
generate the first signal representing the first ambient temperature proximal the first battery rack during a first time period; and
generate a second signal representing a second ambient temperature proximal the first battery rack during a second time period succeeding the first time period;
further comprising a second humidity sensor arranged on the first battery rack, the second humidity sensor configured to:
generate a third signal representing a first ambient humidity proximal the first battery rack during the first time period; and
generate a fourth signal representing a second ambient humidity proximal the first battery rack during the second time period; and
wherein the first controller comprises the first controller configured to:
receive the second signal, the third signal, and the fourth signal;
calculate a first temperature change value based on difference between the second ambient temperature and the first ambient temperature;
calculate a first humidity change value based on difference between the second ambient humidity and the first ambient humidity; and
detect the first precursor condition in response to:
the first temperature change value exceeding a predefined temperature change threshold; and
the first humidity change value exceeding a predefined humidity change threshold.

11. The system of claim 9:
wherein the first temperature sensor comprises the first temperature sensor configured to:
generate the first signal representing the first ambient temperature proximal the first battery rack during a first time period; and
generate a second signal representing a second ambient temperature proximal the first battery rack during a second time period succeeding the first time period;
further comprising a second humidity sensor arranged on the first battery rack, the second humidity sensor configured to:
generate a third signal representing a first ambient humidity proximal the first battery rack during the first time period; and
generate a fourth signal representing a second ambient humidity proximal the first battery rack during the second time period; and
wherein the first controller is configured to:
receive the second signal, the third signal, and the fourth signal;
generate a first notification specifying the first ambient temperature and the first ambient humidity;
serve the first notification to a user interface;
generate a second notification specifying the second ambient temperature and the second ambient humidity; and
serve the second notification to the user interface.

12. The system of claim 1:
wherein the first sensor comprises a first light sensor configured to generate the first signal representing a first ambient light intensity proximal the first battery rack during a first time period;
further comprising a second humidity sensor configured to:
generate a second signal representing a first ambient humidity proximal the first battery rack during the first time period; and
generate a third signal representing a second ambient humidity proximal the first battery rack during a second time period succeeding the first time period; and
wherein the first controller comprises the first controller configured to:
receive the second signal and the third signal;
calculate a first humidity change value based on a difference between the second ambient humidity and the first ambient humidity; and
detect the first precursor condition in response to:
the first ambient light intensity exceeding a predefined light intensity threshold; and
the first humidity change value exceeding a predefined humidity change threshold.

13. The method system of claim 1:
wherein the first sensor comprises a first light sensor configured to:
generate the first signal representing a first ambient light intensity proximal the first battery rack during a first time period; and
generate a second signal representing a second ambient light intensity proximal the first battery rack during a second time period succeeding the first time period;

further comprising a second gas sensor configured to:
  generate a third signal representing a first gas concentration in ambient air proximal the first battery rack during the first time period; and
  generate a fourth signal representing a second gas concentration in ambient air proximal the first battery rack during the second time period succeeding the first time period; and
wherein the first controller comprises the first controller configured to:
  receive the second signal, the third signal, and the fourth signal;
  calculate a first ambient light intensity change value based on a difference between the second ambient light intensity and the first ambient light intensity;
  calculate a first gas concentration change value based on a difference between the second gas concentration and the first gas concentration; and
  detect the first precursor condition in response to:
    the first ambient light intensity change value exceeding a predefined light intensity change threshold; and
    the first gas concentration change value exceeding a predefined gas concentration change threshold.
14. The system of claim 1:
wherein the first controller comprises the first controller configured to:
  in response to detecting the first precursor condition, generate a notification indicating the first precursor condition and the open state of the first valve; and
  serve the notification to a user interface.
15. The system of claim 14:
wherein the first battery rack comprises the first sensor arranged on the first battery rack; and
wherein the first controller comprises the first controller configured to:
  associate the fire event with a first location of the first battery rack within an energy storage facility in response to detecting the first precursor condition; and
  generate the notification indicating the fire event at the first location.
16. A method comprising:
a first sensor arranged on a first battery rack:
  the first sensor generating a first signal representing ambient condition proximal the first battery rack during a first time period, the first battery rack comprising:
    a first battery tray configured to receive a first set of battery cells; and
    a first frame configured to support the first battery tray, the first frame comprising:
      a first inlet fluidly coupled to a fluid supply;
      a first column comprising:
        a first set of perforations arranged on the first column and facing an interior of the first battery rack; and
        a first hollow body fluidly coupled to the first inlet and defining a first channel configured to circulate fluid from the first inlet to the first set of perforations; and
      a second column comprising:
        a second set of perforations arranged on the second column and facing the interior the first battery rack; and
        a second hollow body fluidly coupled to the first column and defining a second channel configured to circulate fluid from the first column to the second set of perforations; and
  a first controller configured to:
    in response to receiving the first signal from the first sensor, detect a first precursor condition to a fire event based on the first signal; and
    in response to detecting the first precursor condition, trigger a first valve to transition from a closed state to an open state, the first valve interposed between the fluid supply and the first inlet.
17. The method of claim 16:
wherein generating the first signal comprises generating the first signal, at the first sensor comprising a first temperature sensor, representing a first ambient temperature proximal the first battery rack during a first time period;
further comprising:
  at the first temperature sensor, generating a second signal representing a second ambient temperature proximal the first battery rack during a second time period succeeding the first time period;
  at a second humidity sensor arranged on the first battery rack:
    generating a third signal representing a first ambient humidity proximal the first battery rack during the first time period; and
    generating a fourth signal representing a second ambient humidity proximal the first battery rack during the second time period; and
  at the first controller, in response to receiving the first signal, the second signal, the third signal, and the fourth signal:
    calculating a first temperature change value based on a difference between the second ambient temperature and the first ambient temperature; and
    calculating a first humidity change value based on a difference between the second ambient humidity and the first ambient humidity; and
wherein detecting the first precursor condition comprises detecting the first precursor condition in response to:
  the first temperature change value exceeding a predefined temperature change threshold; and
  the first humidity change value exceeding a predefined humidity change threshold.
18. The method of claim 16:
wherein generating the first signal comprises generating the first signal, at the first sensor comprising a first light sensor, representing a first ambient light intensity proximal the first battery rack during a first time period;
further comprising:
  at a second humidity sensor arranged on the first battery rack:
    generating a second signal representing a first ambient humidity proximal the first battery rack during the first time period; and
    generating a third signal representing a second ambient humidity proximal the first battery rack during a second time period succeeding the first time period; and
  at the first controller, in response to receiving the second signal and the third signal, calculating a first humidity change value based on a difference between the second ambient humidity and the first ambient humidity; and wherein detecting the first precursor condition comprises detecting the first precursor condition in response to:
the first ambient light intensity exceeding a predefined light intensity threshold; and
the first humidity change value exceeding a predefined humidity change threshold.

19. The method of claim 16, further comprising, at the first controller, in response to detecting the first precursor condition:
associating the fire event with a first location of the first battery rack within an energy storage facility;
generating a notification indicating the open state of the first valve and the fire event at the first location; and
serving the notification to a user interface.

* * * * *